US008392886B2

(12) United States Patent
Sweis et al.

(10) Patent No.: US 8,392,886 B2
(45) Date of Patent: Mar. 5, 2013

(54) SYSTEM, PROGRAM PRODUCT, AND METHODS TO ENABLE VISUAL RECORDING AND EDITING OF TEST AUTOMATION SCENARIOS FOR WEB APPLICATION

(75) Inventors: Faris A. Sweis, Austin, TX (US); Christopher L. Eyhorn, Austin, TX (US)

(73) Assignee: ArtofTest, Inc., Austin, TX (US)

( * ) Notice: Subject to any disclaimer, the term of this patent is extended or adjusted under 35 U.S.C. 154(b) by 1109 days.

(21) Appl. No.: 12/329,393

(22) Filed: Dec. 5, 2008

(65) Prior Publication Data
US 2009/0133000 A1    May 21, 2009

Related U.S. Application Data

(63) Continuation-in-part of application No. 11/598,519, filed on Nov. 13, 2006, now Pat. No. 7,934,201.

(60) Provisional application No. 61/012,049, filed on Dec. 6, 2007, provisional application No. 60/852,314, filed on Oct. 17, 2006.

(51) Int. Cl.
*G06F 9/44* (2006.01)
(52) U.S. Cl. .................... 717/125; 717/124
(58) Field of Classification Search .................. 717/125
See application file for complete search history.

(56) References Cited

U.S. PATENT DOCUMENTS

| | | | |
|---|---|---|---|
| 5,394,347 A | 2/1995 | Kita | |
| 5,758,061 A | 5/1998 | Plum | |
| 6,173,440 B1 * | 1/2001 | Darty | 717/130 |
| 6,986,125 B2 * | 1/2006 | Apuzzo et al. | 717/124 |
| 7,093,238 B2 | 8/2006 | Givoni et al. | |
| 7,774,383 B2 * | 8/2010 | Acevedo-Aviles et al. | 715/760 |
| 2003/0208351 A1 | 11/2003 | Hartman | |
| 2005/0166094 A1 | 7/2005 | Blackwell et al. | |
| 2006/0064399 A1 | 3/2006 | Desio | |
| 2006/0253840 A1 | 11/2006 | Cruickshank | |
| 2007/0022407 A1 | 1/2007 | Givoni | |
| 2007/0168970 A1 | 7/2007 | Li et al. | |
| 2008/0092119 A1 | 4/2008 | Sweis | |

OTHER PUBLICATIONS

Cachero et al., "Object-Oriented Conceptual Modeling of Web Application Interfaces: the OO-HMethod Abstract Presentation Model," Springer-Verlag, 2000, 10pg.*
Elbaum et al., "Leveraging User-Session Data to Support Web Application Testing," DigitalCommons@University of Nebraska—Lincoln, 2005, 16pg.*
International Search Report and the Written Opinion of the International Searching Authority, dated Jan. 28, 2009, 13 pages.

(Continued)

*Primary Examiner* — Li B Zhen
*Assistant Examiner* — Ryan Coyer
(74) *Attorney, Agent, or Firm* — Bracewell & Giuliani LLP

(57) ABSTRACT

Systems to provide automated testing of a markup software application, program product, and methods are provided. An example of a system can include a network, at least one computer including memory and a processor, and application testing program product stored in the memory of the at least one computer. The application testing program product can include instructions that when executed by the processor of the respective computer causes the respective computer to perform various operations to include receiving a user selection identifying a target element of an application; determining a command describing an action being performed; identifying a translator responsive to a captured command; and generating at least one of the following: an abstract script describing the action being performed by the target element, a context-sensitive verification available for the target element, or a context sensitive synchronization available for the target element.

42 Claims, 20 Drawing Sheets

OTHER PUBLICATIONS

Huang et al., "A testing framework for Web application security assessment," Elsevier, 2005, 23pg.*

Kapfhammer, G., "A Comprehensive Framework for Testing Database-Centric Software Applications" University of Pittsburgh Thesis, Apr. 19, 2007, 39 pages.

SW Explorer Automation What s SW Explorer Automation?, found at http://home.comcast.net/~furmana/SWIEAutomation.htm, internet printout Nov. 10, 2006, 2 pages.

Non-Final Office Action for Related U.S. Appl. No. 13/078,142 dated Jul. 5, 2012.

* cited by examiner

SYSTEM, PROGRAM PRODUCT, AND METHODS TO ENABLE VISUAL RECORDING AND EDITING OF TEST AUTOMATION SCENARIOS FOR WEB APPLICATION

RELATED APPLICATIONS

This application is a continuation-in-part of and claims the benefit of and priority to U.S. patent application Ser. No. 11/598,519, filed on Nov. 13, 2006, titled "System, Method, and Computer Readable Medium for Universal Software Testing," which claims the benefit of and priority to U.S. Provisional Patent Application No. 60/852,314, filed Oct. 17, 2006, and claims the benefit of and priority to U.S. Provisional Patent Application No. 61/012,049, filed Dec. 6, 2007, titled "System, Program Product, and Method to Enable Visual Recording and Editing of Test Automation Scenarios for Web Applications," each incorporated herein by reference in its entirety.

BACKGROUND OF THE INVENTION

1. Field of the Invention

This invention relates in general to software testing, particularly to software test automation, and more particularly to systems, program product, and methods to enable visual recording and editing of test automation scenarios for markup applications.

2. Description of the Prior Art

Software has become an essential part of everyday life worldwide. Many businesses and individuals rely on software to support their daily activities. The quality and reliability of software has never been as important and critical as it is today. Software providers, whether they provide packaged software products or customized solutions sold to businesses, consider the quality of the software they sell a very serious matter. Software defects can severely jeopardize their entire business, especially given the reality that these defects can detrimentally impact customer loyalty and trust. Recognized by the inventors is that this demand for software quality has been an important catalyst for innovations in the software development lifecycle and specifically in how software is tested throughout that cycle. Another important catalyst is the increasing pressures to produce software faster with lower development and maintenance costs.

Many software development companies test their software by compiling a list of test scripts (a.k.a. test scenarios or test cases) that they run against their software to ensure quality and validate the design of the software. Some companies hire employees or contractors to run these tests manually where others invest in automating these tests so that, once automated, they can be run anytime without any manual labor, and with lower cost. There are many advantages to test automation, including: a reduction in labor costs by eliminating the need for staff for manual execution, a reduction in execution time to allow for faster turnaround on results, e.g., on the order of thousands of test runs in just a few hours; and more accurate and consistent results.

Test scenario automation is typically performed in several ways. Perhaps the oldest is manual scripting using a programming language. A company, for example, hires a professional developer to translate a test scenario to an automated scenario by crafting the code of that test scenario using a programming language that can then be executed. Although this methodology is considered by some practitioners to be the most flexible way to build test automation, it is also generally the most costly as it requires hiring expensive software developers to craft, update, and maintain such automation. A more modern approach includes using a recorder. There are several products on the market today, such as, for example, HP-Mercury Quick Test Professional and Microsoft's Visual Studio Team Test, that enables users to launch their target application under test (AUT), and run their test scenario manually against the application once—which will then record the actions automatically without a need to write any code. Although this can be the cheapest and quickest way to build test automation, such tools are extremely complex and require higher learning costs, which can rival the cost of manual scripting.

There are many categories of contemporary software applications being developed that require testing and span multiple technologies. One type of application, for example, is markup language based applications. These applications are defined using markup languages, such as, for example, HTML, XHTML, XML, XAML, or other similar markup languages. Using a host (a.k.a. a Web browser), these applications are interpreted as graphical user interface (GUI) elements which the user can use to interact with the application logic. A classic example of these types of applications is a web application. Web applications run in a host, such as, for example, Microsoft's Internet Explorer™ and Mozilla's FireFox™ which can interpret an HTML document as visual elements to present it to the user for interaction.

The inventors have recognized various trends with respect to current Web applications being developed. For example, Web applications are being developed using dynamic and rich languages like ASP.NET, PHP, or RubyOnRails, etc., which enable users to build relatively complex applications that are producing complex markups by abstracting the details of HTML into a higher level logical component. Developers are no longer required to be aware of how a specific component's HTML is rendered, and can simply work with the object model provided by these dynamic languages. Users using ASP.NET, for example, can work directly with a "Calendar" component that takes charge of rendering the underlying HTML markup of a calendar. The inventors have also recognized that Web applications are relying more on Javascript and client side logic to perform rich and snappy user experiences that do not require HTTP requests back and forth between client and server. The inventors have further recognized that Web applications are now producing relatively complex user interface (UI) experiences that were NATO previously limited to only rich client applications. Contemporary Web application, using helper libraries like "Yahoo client API library or ASP.NET Ajax extensions," can easily perform actions like drag-drop, resize, modal dialogs pop-up, etc.

The inventors have recognized that the above trends in web application development have resulted in some significant short-comings in current test automation recorder tools. For example, many existing tools perform the automated recording of a web test scenarios by recording the HTTP traffic back and forth between the client (web browser) and the server. Given that many contemporary applications are moving to rely more on the logic of the client than the server, the inventors have recognized that these applications and their scenarios can no longer be recorded using these HTTP based tools. In fact, many of the contemporary applications built today cannot use any of these tools to perform test automation. An example of such tools is the Microsoft Visual Studio Team Test 2005.

The increasingly complex nature of web applications and its increased richness has dramatically increased the complexities of automating UI interactions with these applications. To address these new scenarios, contemporary recording tools in the market today have introduced several add-on options and windows. Recognized by the inventors, however, is that these add-ons simply make the experience more scattered and extremely complex and cumbersome, and that the recording solutions are no longer intuitive and easy to use. Instead users have to configure many options just to have one scenario automated properly. In addition, users that utilize dynamic web development technologies (i.e. ASP.NET) or use $3^{rd}$ party components, such as Infragistics's or Telerik's, have to be intimately knowledgeable with the underlying markup of the application to be able to "figure out" how to automate the scenarios. This leaves a huge gap in knowledge, for example, for non-technical quality assurance (QA) professionals that are simply trying to automate a common end user scenario. Further, recognized by the inventors is that contemporary recording tools provide very little extensibility in the web automation space to extend the overall designer GUI and recording to target custom $3^{rd}$ party components. For example, the inventors believe that none of the tools currently provided in the market offer any extensibility model that specifically targets web scenarios. In addition, the inventors believe that none of these tools offer any ways to provide or extend visual recognition, action recording, verification and synchronization mechanisms, particularly for custom components.

HP-Mercury QuickTest and IBM Rational suites do offer an extensibility model for their respective test automation tools, but that extensibility model is specific to rich windows applications and will not function on web applications. Web applications offer a completely different challenge for extensibility than rich client applications because the nesting level of a component, in addition to its attributes, needs to be part of how a component is recognized, versus simply recognizing the component's attributes and the relative coordinates within that component where the action took place. Further, these tools do not offer any extensibility model for the visual recognition aspect of these components, such as, for example, the identifying icon, color and component nesting, which various embodiments of the present invention addresses. Still further, it is recognized by the inventors is that action recording extensibility for web applications needs to be accomplished by inspecting the atomic target markup element attributes that the action is being performed against, to include its hierarchal location within the Document Object Model of the markup application (e.g., its location with respect to its sibling markup elements, parent chain, and child elements, and any other abstracted components that it might be nested in on the web page), and not merely in the context of the atomic element and the coordinates of the action against that element as provided in the Windows application-based suites.

Accordingly, recognized by the inventors is the need for a system, program product, and methods of providing test automation, which can provide a simple and intuitive recording so that non-technical professionals can utilize the automated systems. Also recognized is the need for a system, program product, and methods of test automation which provide visual cues, action recording, verification and synchronization mechanisms and that can extend the action/action recording, verification and synchronization mechanisms for custom components.

SUMMARY OF THE INVENTION

In view of the foregoing, various embodiments of the present invention can beneficially include systems, program products, and methods, which provide a graphical user interface (GUI) that enable users to execute test scenarios manually once inside the GUI and record these scenarios to a persistence medium, and that can allow users to execute these recorded scenarios multiple times as part of test automation regression runs or general software testing runs. Various embodiments of the present invention also provide an innovative recording surface that enables users to perform an "on spot" visual inspection of their application elements in addition to providing a set of context sensitive tasks to easily automate complex scenarios that current testing tools fail to do. Various embodiments of the present invention also enable sentence-based validation that allows users to easily craft sentence-like statements to perform their test verifications. Various embodiments of the present invention beneficially can extract the details of the markup into a higher-level logical component. Various embodiments of the present invention further offer a completely extensible model that allows users to develop rich and tailored recordings for their components within the system. This, in turn, advantageously, enables them to easily automate the applications that use these components without having to drill down and understand the internals of each component. Various embodiments of the present invention further offer an extensibility model for the visual annotation aspect of these components including the visual annotation of related components, e.g., the identifying icon, color and component nesting.

More particularly, an example of an embodiment of the present invention includes a system to provide automated testing of a software application. The system can include a computer network; a first database including a plurality of document object models having object characteristics and attributes; a second database including a plurality of predefined Translators, with each Translator translating between an element in at least one of the plurality of document object models and an abstract definition of a task, verification, and synchronization available to any element of any one of the plurality of document object models matching the element associated with the respective Translator; and a third database including a plurality of predefined Automation Descriptor objects each encapsulating operations to execute an associated action, logic to execute the action, and logic to generate a script for the action. The system can also include: a first computer in communication with the computer network to execute server functions of software applications under test; a second computer in communication with the first computer through the computer network and each of the first, second and third databases to execute client functions of software applications under test; and application testing program product stored in the memory of at least one of the first or the second computers.

According to this example of an embodiment of the present invention, the application testing program product can include instructions that when executed by the processor of the respective computer causes the respective computer to perform the operations of providing a recording surface to functionally overlay a graphically displayed component of a markup application to capture graphical user inputs to a target element of the graphically displayed markup application component, receiving a user selection identifying the target element of the graphically displayed component of the markup application responsive to the graphical user inputs, and determining a command describing an action being performed by the user on the target element through the recording surface. The operations can also include generating a structure describing the action performed by the user on the target element and a location of the target element to define a captured command, identifying a translator responsive to the captured command and the selected target element, and generating an abstract script describing an action being performed by the target element responsive to the identified translator.

According to another example of an embodiment of the present invention, the application testing program product can include instructions that when executed by the processor of the respective computer causes the respective computer to perform the operations of receiving a user selection identifying a target element of an application, determining a command describing an action being performed defining a captured command, identifying a Translator responsive to the captured command, and generating at least one of the following: an abstract script describing the action being performed by the target element, a context-sensitive verification available for the target element, or a context sensitive synchronization available for the target element, responsive to the identified Translator.

According to another example of an embodiment of the present invention, a system to provide automated application testing of a markup software application can include a first computer in communication with a computer network to execute server functions of software applications under test, a second computer in communication with the first computer through the computer network to execute client functions of software applications under test, and application testing program product stored in the memory of at least one of the first or the second computers to provide automated application testing of a markup software application.

According to an example of an embodiment of the present invention, the application testing program product can include a set of instructions that, when executed by a computer, cause the computer to perform the operations of providing a recording surface to functionally overlay a graphically displayed component of a markup application to capture graphical user inputs to a target markup element of the graphically displayed markup application component to thereby generate a structure describing an action performed by the user on the target markup element, and generating one or more of the following: a customized abstract script describing the action being performed by the target markup element; a context-sensitive sentence-based verification available for the target markup element, and a context sensitive synchronization available for the target markup element, responsive to the graphical user input.

According to an example of an embodiment of the present invention, the application testing program product can include a recording surface for a graphically displayed pointer to overlay a graphically displayed component of a markup application to capture graphical user inputs to a target markup element and to generate a structure describing an action performed by the user on the target markup element and a location of the target markup element defining a captured command; a translation manager configured to manage locating a translator associated with the captured command, when existing, and including a control locator interface configured to provide data to match the target element with the translator; and an automation descriptor configured to provide data to execute a task, logic to execute the task, and logic to generate script for the task responsive to the translator.

Advantageously, various embodiments of the present invention can provide a Graphical User Interface (GUI) to enable automated recording of user actions and to persist these actions to a persistence medium that can later be used to execute the same scenario, multiple times, as part of test automation and software testing. Such enhanced automation can advantageously result in improved test coverage, reduced testing execution time, decreased test escapes into production, and improved test repeatability. Embodiments of the present invention also introduce the concept of an "Automation Overlay Surface" (AOS), which is a transparent glass-like layer that is transposed on top of a Web browser or other host hosting the application, that offers visual interaction with surface elements and direct context sensitive annotations to elements under the user's pointing device (e.g., mouse pointer). As the user moves the pointer around a graphically displayed application to perform an action on the surface, a target element is continuously annotated. According to an embodiment of the invention, these annotations are continuously adapted to the element being targeted by continuously inspecting the attributes and nesting hierarchy of the element under the pointing device and checking for custom components and their custom annotations to be displayed. These context sensitive annotations advantageously can offer "Context Sensitive Quick Tasks" ("CSQT") that allow users to intuitively and quickly automate some of the more common scenarios right there on the automation browser in one click including, e.g., recording, verification and synchronization actions, without the need to drill down into complex and cumbersome configuration screens and windows that current recording tools require.

Advantageously, various embodiments of the present invention can further offer an extensibility model for the visual annotation on the AOS so that custom components can be visually annotated (i.e., provide visual cues) using a custom defined icon, border color, etc. Further, the visual annotation extensibility model can provide each component the ability to define a list of other related components to visually annotate concurrently when the respective component is nested within one of those related components.

Various embodiments of the present invention can provide extensibility to third parties and end users for the entire recording system including the Automation Overlay Surface and Context Sensitive Quick Tasks to allow them to extend the annotations on the Automation Overlay Surface to include user developed annotations, and to extend the Context Sensitive Quick Tasks of each element with user-developed abstracted tasks depending on the element, its location, and its logical belonging to an abstracted component and its hierarchal relationship to other abstract component Various embodiments of the present invention can also provide a "Sentence Based" (SB) or natural language verification and synchronization user interface that guides the users in building verification and synchronization scenarios. The "Sentence Based" verification eliminates the complexities of verification automation by phrasing the verification in simple sentences that describes the desired out-come. According to an embodiment of the present invention, the SB system is completely extensible by third parties and end users to allow creation and utilization of user developed sentence based verification and synchronization structures to plug into.

Various embodiments of the present invention can also include methods to enable quick visual recording and editing of test automation scenarios for markup applications. For example, according to an embodiment of the present invention, such a method can include the steps of detecting a graphically displayed component of a markup application displayed by a markup application under test responsive to user graphical manipulation of a graphically displayed pointer over the component; identifying the component using a document object model, for example, an Internet Explorer object model, and the unique characteristics or attributes of the component including its hierarchal nesting responsive to the step of detecting; and searching for available tasks associated with the component from a library of objects responsive to the step of identifying the component. The tasks can include action, verification, and synchronization tasks. Action tasks can include identification of the action performed by a selected element within the graphically displayed component. Verification tasks can include verification that the action performed is the action to be performed, a value returned is the value expected to be returned, etc. Synchronization tasks include identifying the temporal relationship to other actions.

According to another embodiment of the present invention, a computer implemented method of providing automated application testing of a markup software application, can include the steps of providing a recording surface to functionally overlay a graphically displayed component of a markup application being executed on and displayed by a computer to capture graphical user inputs to a target markup element of the graphically displayed markup application component, receiving a user selection by a user identifying the target markup element of the graphically displayed component responsive to manipulation of a graphically displayed pointer displayed by the computer (graphical user input), determining a command describing an action being performed by the user on the target markup element through the recording surface, generating a structure describing the action performed by the user on the target markup element and a location of the target markup element to define a captured command, identifying a translator responsive to the captured command and the selected target markup element, and translating the captured command to an automation descriptor. The method can also include generating script describing a customized abstract script describing an action being performed by the target markup element, a context-sensitive sentence-based verification available for the target markup element, and/or a context sensitive synchronization available for the target markup element, responsive to the graphical user input and the automation descriptor.

BRIEF DESCRIPTION OF THE DRAWINGS

So that the manner in which the features and advantages of the invention, as well as others which will become apparent, may be understood in more detail, a more particular description of the invention briefly summarized above may be had by reference to the embodiments thereof which are illustrated in the appended drawings, which form a part of this specification. It is to be noted, however, that the drawings illustrate only various embodiments of the invention and are therefore not to be considered limiting of the invention's scope as it may include other effective embodiments as well.

DETAILED DESCRIPTION OF THE INVENTION

Figure 1:
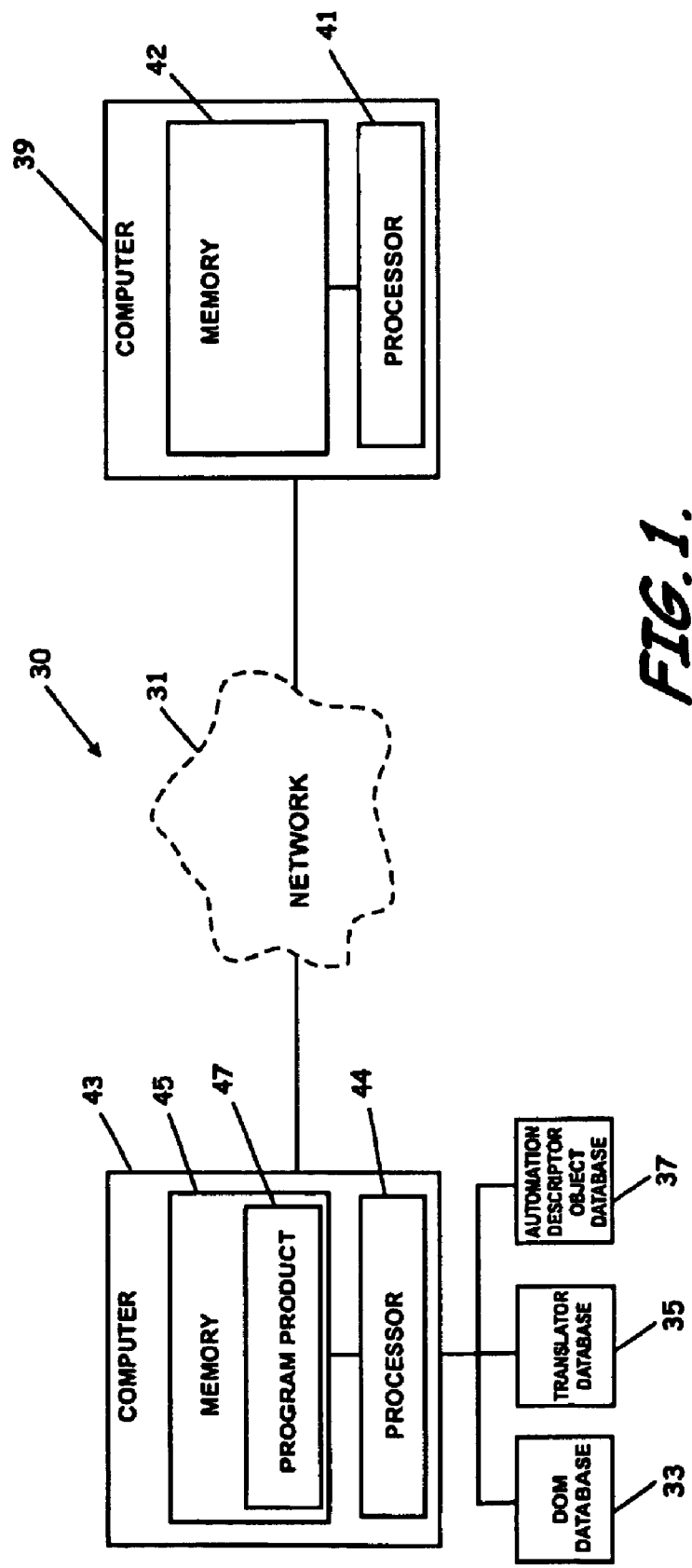
FIG. 1 is a schematic diagram of a general system architecture of a system to provide automated application testing of a software application performance according to an embodiment of the present invention.

The present invention now will be described more fully hereinafter with reference to the accompanying drawings in which embodiments of the invention are shown. This invention may, however, be embodied in many different forms and should not be construed as limited to the illustrated embodiments set forth herein; rather, these embodiments are provided so that this disclosure will be thorough and complete, and will fully convey the scope of the invention to those skilled in the art. Like numbers refer to like elements throughout.

As shown in FIGS. 1-18, various embodiments of the present invention can include a system 30, program product, and methods that provide a graphical user interface (GUI) that enables users to execute test scenarios manually once inside the GUI and record these scenarios to a persistence medium, and that can allow users to execute these recorded scenarios multiple times as part of test automation regression runs or general software testing runs. As will be described in more detail below, various embodiments of the system 30, for example, can provide an innovative recording surface that enables users to perform "on spot" visual inspection of their application elements in addition to providing a set of context sensitive actions to easily automate complex scenarios that current testing tools fail to do. Various embodiments of the system can also enable sentence based validation that allows users to easily craft sentence-like statements to perform their test verifications. Various embodiments of the system 30 can beneficially extract the details of markup into a higher-level logical component. Various embodiments of the system 30 can further offer a complete extensible model that allows users to develop rich and tailored recordings for their components within the system 30 to include the visual annotations of these components. This, in turn, can enable them to easily automate the applications that use these components without having to drill down and understand the internals of each component.

Various terms used throughout are provided below:

---

Terms:

AutomationDescriptor: An "AutomationDescriptor," "Automation Descriptor," or simply "Descriptor" is an object that encapsulates knowledge on how to perform and persist a certain action, verification or synchronization. The Automation Descriptor 55 embodies the information needed to execute an action, the logic to perform the action and the logic to generate the script for it. AutomationDescriptors can either be "ActionDescriptors," "VerificationDescriptors," or "VerificationDescriptors" that act as synchronizations.

CapturedCommand: A "CapturedCommand" or "Captured Command" is simply a structure that contains information that describes exactly what has been performed on the recording surface in raw and generic terms. It also contains information regarding the element (e.g., target element) that the action has been performed against, and its location. This structure is where additional information can be added from the surface, if needed. (Example command: a click on an element, a verification request for an element, . . . etc).

FindParam: A "FindParam" is a structure that can be used to define a specific pattern to be recognized within a particular Document Object Model ("DOM") of a markup application. The FindParam is used to match a set of elements within that DOM that conform to a certain pattern to thereby identify such element or elements.

IControlLocator: An "IControlLocator" is an interface that provides the basic information needed for the TranslationManager to match a target element with a Translator. The IControlLocator interface also (optionally) offers visual annotation information to the AOS to use when the component defined by IControlLocator is detected, including custom icon, border color and a reference to other related Translators that need to also be visually annotated too.

Locators: The "Locators" is an array of FindParams that describe 1 to n DOM element patterns that a specific Translator can match.

Translator: A Translator is a component that implements the IControlLocator and is associated with a list of FindParams. The Translator describes the actions, verifications and synchronizations available to any element in the DOM that matches any of the FindParams associated with the Translator including (optionally) the visual annotation needed on the AOS TranslatorGroup: A "TranslatorGroup" or "Translator Group" is an object that contains 1 to n Translator objects. A TranslatorGroup can also provide actions, verifications, and synchronizations common for the entire group of Translators it contains to include the visual annotations for all Translators in that group that don't define their own visual annotation.

IdentifyAsContainer: An "IdentifyAsContainer" is a boolean property on the IControlLocator interface that defines the behavior of how a certain Translator is matched. If this property is set to "true" then all actions on elements nested within an the matched Translator will be routed to that Translator. Otherwise, only elements that match that Translator directly will be routed to that Translator--i.e., none of its parents, siblings, or children will be routed to that Translator.

TranslationManager: The "TranslationManager" or "Translation Manager" is the brain of the system. The TranslationManager takes in a CapturedCommand, inspects its target element, and then, using the FindParams of all loaded Translators, will try to match that command with a Translator. Once one is found, it will request the found Translator to translate the CapturedCommand to an AutomationDescriptor that can then be recorded and persisted in the system.

TranslatorGroupHierarchy: This term refers to how the TranslationManager organizes the TranslatorGroups loaded. Each group has an order between 0 to n. A group with the highest order is allowed to translate the CapturedCommand, first. If it fails, then the group below it will next be provided the chance to translate the CapturedCommand. The TranslationManager will stop attempting to translate when it reaches the 0 order or when a Translator returns an AutomationDescriptor.

TranslationMatch: The "TranslationMatch" or "Translation Match" is the structure that contains the results of a translation requirement. I.e. the structure can contain the target element for which a requirement for translation was requested, the Translator that matched that element, the TranslatorGroup that this element belongs to, and the locator element that matched one of the Translator's Locators.

FIG. 1 illustrates an exemplary high-level block diagram of a system 30 to test a software application, to include markup (e.g., Web) applications. The system 30 can include a computer network 31; a first database 33 including a plurality of document object models (or "DOMs") including object characteristics and attributes; and a second database 35 including a plurality of predefined Translators 54 (see, e.g., FIG. 2) each translating between an element in at least one of the plurality of document object models and an abstract definition of an action, verification, synchronization, and/or visual annotations available to any element of any one of the plurality of document object models matching the element associated with the respective Translator 54, with at least portions of the plurality of Translators 54 interconnected to form a nested tree of Translators 54.

The system 30 can also include a third database 37 including a plurality of predefined automation descriptor objects each encapsulating operations to execute an associated task, logic to execute the task, and logic to generate a script for the task. The system 30 can also include a first computer 39 including a processor 41 and memory 42 in communication with the processor 41, positioned in communication with the computer network 31 to execute various functions, e.g., server functions, of the software applications under test; and a second computer 43 including a processor 44 and memory 45, positioned in communication with the first computer 39 through the computer network 31 and each of the first, second, and third databases 33, 35, 37, to execute client functions of software applications under test.

Note, memory 42, 45, can include volatile and nonvolatile memory known to those skilled in the art including, for example, RAM, ROM, and magnetic or optical disks, just to name a few. Note also, processor 41, 44, shown schematically in FIG. 1, each represent a single processor, or a cluster of multiple processors and is not limited to any individual physical processor.

The system 30 further includes an application testing program product 47 stored in the memory 42, 45, of at least one of the first or the second computers 39, 43. The application testing program product 47 can include instructions that when executed by the processor 41, 44, of the respective computer 39, 43, causes the respective computer 39, 43 to perform various operations to include the operations of receiving a user selection identifying a target element 65 (see, e.g., FIG. 4) of an application; determining a command describing an action being performed; identifying a Translator 54 responsive to a captured command; and generating at least one of the following: a visual annotation of the element 65, an abstract script describing the action being performed by the target element 65, a context-sensitive verification available for the target element 65, or a context sensitive synchronization available for the target element 65, responsive to the identified Translator 54.

Note, the application testing program product 47 can be in the form of microcode, programs, routines, and symbolic languages that provide a specific set for sets of ordered operations that control the functioning of the hardware and direct its operation, as known and understood by those skilled in the art. Note also, the application testing program product 51, according to an embodiment of the present invention, need not reside in its entirety in volatile memory, but can be selectively loaded, as necessary, according to various methodologies as known and understood by those skilled in the art.

Figure 2A:
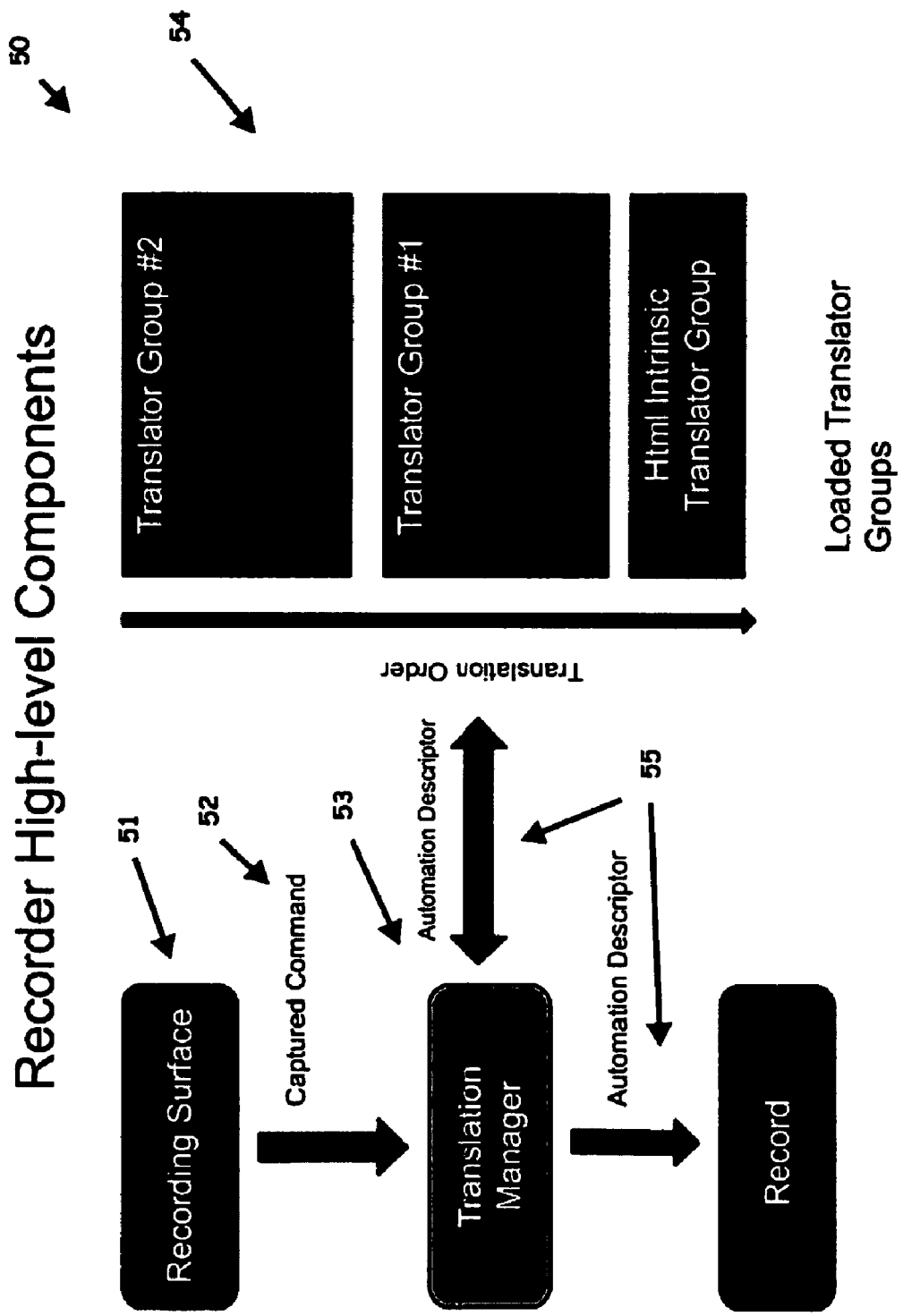
FIG. 2A is a schematic flow diagram illustrating high-level functions of a recorder according to an embodiment of the present invention.
Figure 2B:
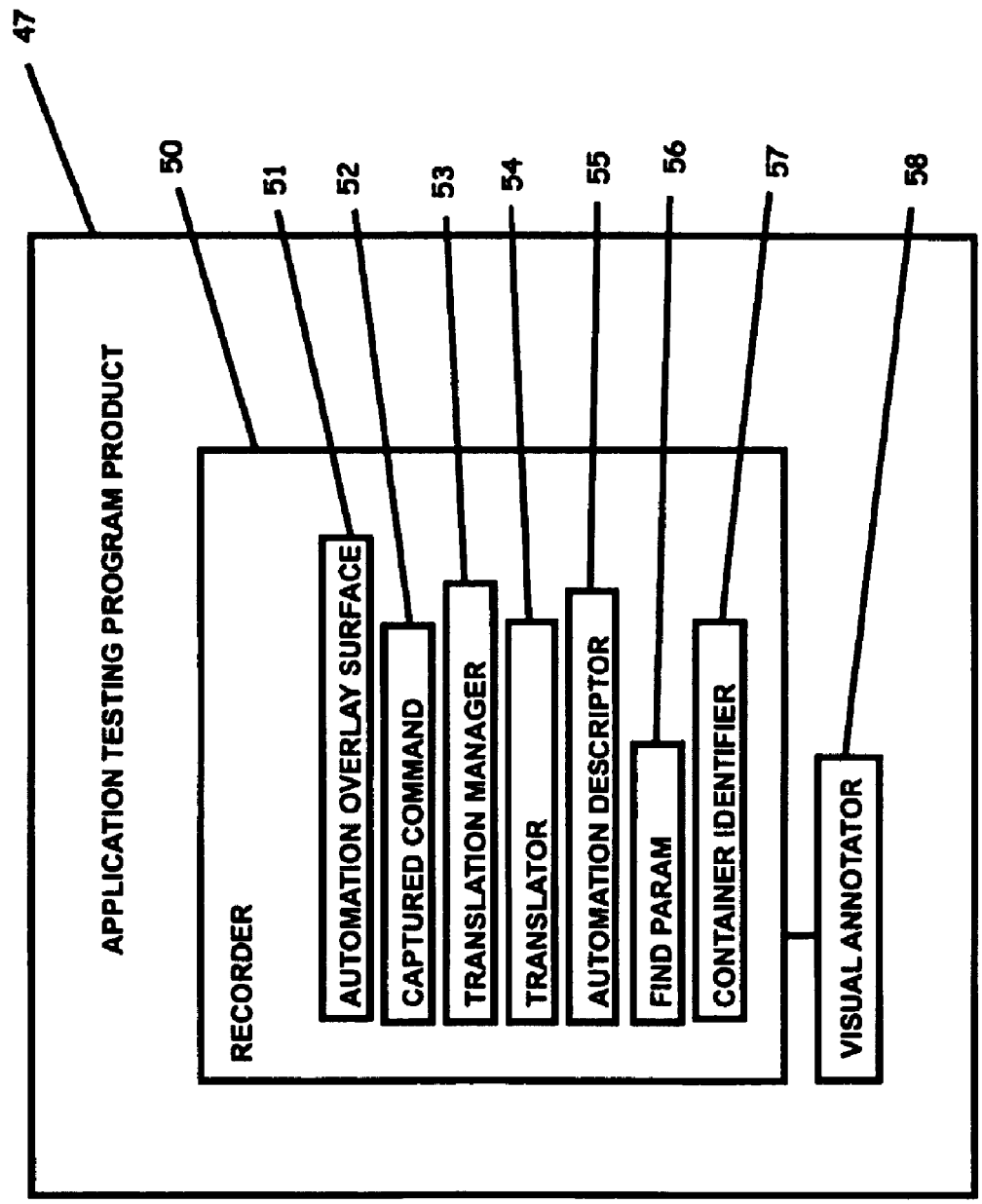
FIG. 2B is a schematic block diagram of components of a recorder according to an embodiment of the present invention.

As perhaps best shown in FIGS. 2A-2B, illustrating high-level functional components associated with the application testing program product 47, the application testing program product 47 can include a recorder 50 configured to provide a recording surface 51 (e.g., "Automation Overlay Surface" or "AOS," see FIG. 4) for a graphically displayed pointer graphic, e.g., mouse pointer 61, which is, in turn, functions to overlay a graphically displayed component/structure 63 of a markup application to capture user inputs to an element 65 of the displayed structure 63 ("target element" 65), and to generate a structure describing an action performed by the user on the target element that the action was performed against, along with the location of the element ("Captured Command" 52), responsive to the user inputs to the target element. Note, although illustrated in FIG. 4 as a visible overlay, according to a preferred configuration, the overlay of recording surface 51 is invisible to the user, functioning instead, as a clear matrix designed to intercept command inputs to be accomplished on the displayed component/structure 63.

According to an embodiment of the present invention, the application testing program product 47, either separately, or as part of the recorder 50, can also include a Translation Manager 53 configured to manage locating at least one Translator 54, when existing, associated with the Captured Command 52. The Translation Manager 53 includes a control locator interface, e.g., IControlLocator, configured to provide data to match the target element 65 with a Translator 54 and data regarding the visual annotation of the element on the AOS.

According to an embodiment of the present invention, the application testing program product 47, either separately, or as part of the recorder 50, can further include an automation descriptor (e.g., "Automation Descriptor" 55") configured to provide data to execute a task, logic to execute the task, and logic to generate script for the task. According to an embodiment of the Automation Descriptor 55, a verification provider associated with the Automation Descriptor 55 returns a VerificationDescriptor that can serve for both verification and synchronization tasks According to an embodiment of the present invention, the application testing program product 47, either separately, or as part of the recorder 50, can also include a find parameter locator, e.g., FindParam 56, configured to describe a location of a specific markup element in a markup document to thereby describe document object model elements of each of a plurality of document object models of interest to a certain Translator 54 (used by the Translation Manager 53 to select Translators 54 associated with a target element).

According to an embodiment of the present invention, the application testing program product 47, either separately, or as part of the recorder 50, can also include a container identifier 57 configured to identify all document object model elements found by the find parameter locator.

According to an embodiment of the present invention, the application testing program product 47, either separately, or as part of the recorder 50, can further include a "Quick Task" interface/menu 75 configured to display ActionDescriptors, VerificationDescriptors which provide verification, and VerificationDescriptors which provide synchronization associated with a Translator 27.

According to an embodiment of the present invention, the application testing program product 47, either separately, or as part of the recorder 50, can still further include a Visual Annotator 58 configured to provide a visual annotation associated with each Translator 54 including its identification icon 67, border color, and any related parent Translators 54.

Figure 3:
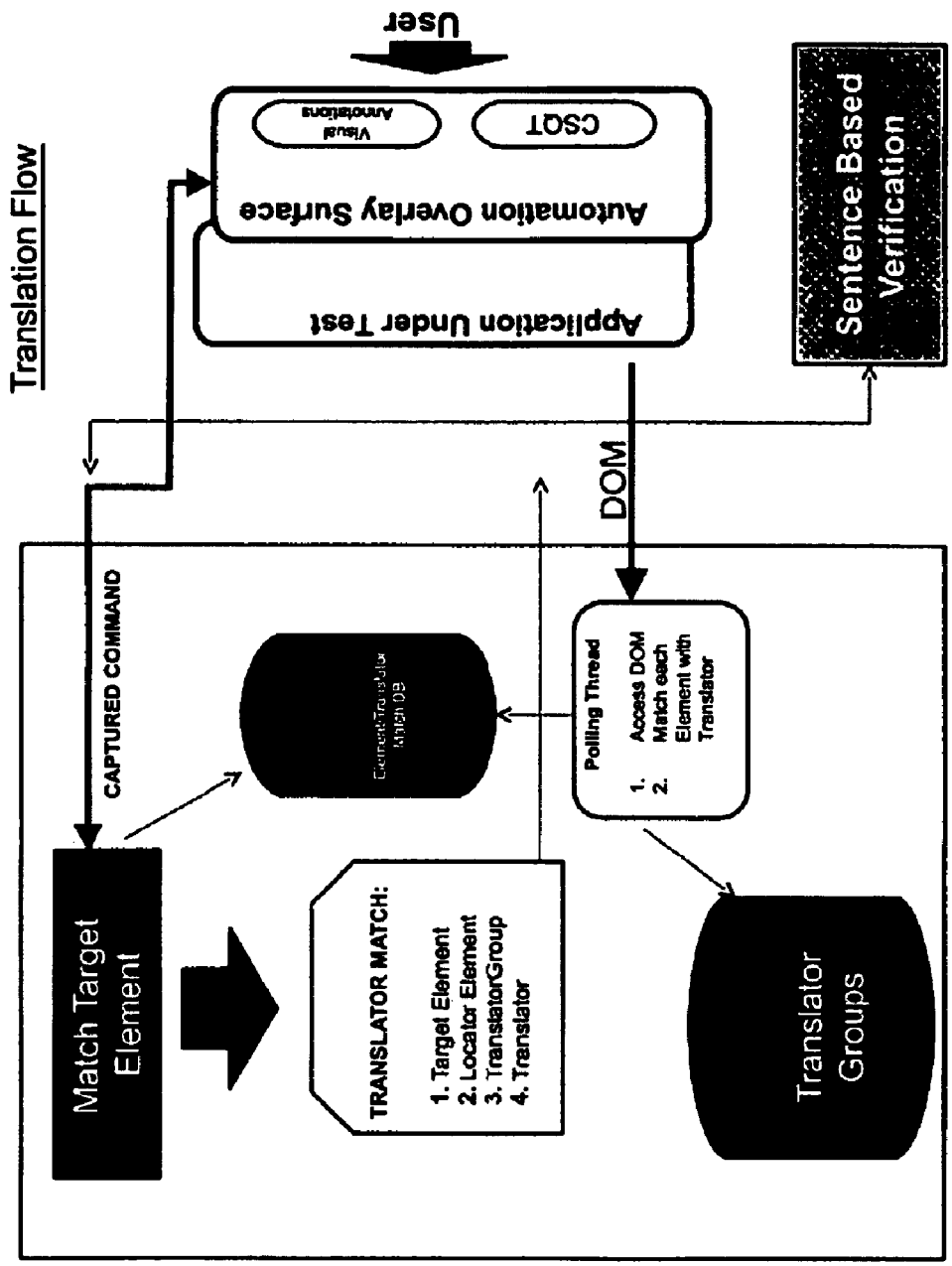
FIG. 3 is a schematic flow diagram illustrating translation management according to an embodiment of the present invention.

FIG. 3 provides a high level flow diagram illustrating high-level functions of the application testing program product 47. As perhaps best shown in FIGS. 2 A, 2B, and 3, the overall logic of the systems 30, program product 47, and methods to perform automation recording according to a preferred configuration is provided.

Accordingly, in order to prepare a markup application, such as that shown in FIGS. 4-16, for example, for multiple testing iterations, the user first records a context-based scenario, utilizing recorder 50. To perform the recording, the user performs an action on the "Automation Overlay Surface" or "AOS" 51 overlaid upon a graphically displayed structure 63 of the markup application.

As will be described in more detail in the selected illustrative examples that follow, as perhaps best shown in FIGS. 2 and 5, the user first clicks on the target element (link) 65 that represents December 1$^{st}$ in the structure 63. As soon as the click is performed, the recorder 50 crafts a captured command (e.g., "Captured Command" 52) that describes this action and forwards it on to the Translation Manager 53. The system 30 can craft the Captured Command 52, for example, by listening to the events of the hosted browser window using their documented APIs for the application under test.

Once a Captured Command 52 is crafted, the Translation Manager 53 takes that Captured Command 52 and routes it to the appropriate Translator 54 loaded in the system. Translator 54 selection is performed by the Translation Manager 53, using the FindParam structure 56, for example, to match the Captured Command 52 with the appropriate Translator 54. In a preferred configuration, the Translation Manager 53 walks down the, e.g., nested, Translator hierarchy ("TranslatorGroupHierarchy") to identify the matching Translator 54. That is, according to the preferred configuration, if the first of "n" Translators 54 does not return an Automation Descriptor 55, it continues down the hierarchy until a Translator 54 returns an Automation Descriptor 55 or until it reaches order 0.

As indicated above, the found Translator 54 is passed the Captured Command 52 and is asked to translate it to an Automation Descriptor 55. If the Translator 54 is able to translate the command, an automation descriptor object ("Automation Descriptor") 55 is returned to the Translation Manager 53. In this illustration, the Translation Manager 53 then records that Automation Descriptor 55 in the system, for example, in database 37. Beneficially, the recorded Automation Descriptor 55 can contain all the needed information to execute that action. As such, the Automation Descriptor 55 can be invoked at a later time to execute this step again and again. It can also be edited to modify the behavior of the recorded script within the allowable properties of the particular Automation Descriptor 55.

According to an embodiment of the present invention, all Translators 54 can derive from a locator interface (e.g., the "IControlLocator" interface), which can provide the basic information needed for the Translation Manager 53 to match a target element 65 with the appropriate Translator 54:

```
public interface IControlLocator : IInterfaceInterrogator
{
    /// <summary>
    /// True/False whether the recording for this control is
    enabled/disabled
    /// </summary>
    bool Enabled
    {
      get;
      set;
    }
    /// <summary>
```

```
    /// Get this control locator.
    /// </summary>
    /// <returns></returns>
    FindParam[] Locators
    {
      get;
    }
    /// <summary>
    /// The name of this translator.
    /// </summary>
    string Name
    {
      get;
    }
    /// <summary>
    /// True/False whether to match this control
    /// for any of its children.
    /// If set to false, only exact matches to FindParam returned by
    Locators will
    /// be passed into this translator
    /// </summary>
    bool IdentifyAsContainer
    {
      get;
    }
    /// <summary>
    /// True/False whether to use only desktop actions for this control.
    /// This is ignored if IdentifyAsContainer is set to false.
    /// </summary>
    bool UseDesktopActionsOnly
    {
      get;
      set;
    }
    /// <summary>
    /// Gets a list of associated parent
    /// locators that can be located at the same time
    /// as this locator (if they are available)
    /// </summary>
    Type[] ParentLocators
    {
      get;
    }
    /// <summary>
    /// Identify Color for this locator.
    /// </summary>
    System.Drawing.Color IdentifyColor
    {
      get;
    }
    /// <summary>
    /// Identify Icon for this locator
    /// </summary>
    System.Drawing.Image IdentifyIcon
    {
      get;
    }
}
```

According to the preferred configuration, the Translation Manager 53 uses the "IdentifyAsContainer" and the "Locators" array of FindParams 56 to figure out if a particular Translator 54 has any interest in the target element 65 contained in the Captured Command 52. The Locators array of FindParams 56 can describe all the types of DOM elements that the particular Translator 54 is interested in. The IdentifyAsContainer can notify the Translation Manager 53 that the Translator 54 not only wants to attempt to translate actions performed on an element that matches one of the Locators, but also of all elements contained within these Locators. For example, for the following markup:

```
<div id="div1">
    <div id="div2">
        SOME TEXT
    </div>
</div>
```

As an example of how web recording is uniquely different from rich client recording, assume a Translator 54 has a Locators list of only one FindParam 56, for example, and that the FindParam structure 56 describes a markup element 65 that has ID=Div1. If IdentifyAsContainer is set to "True," then whenever an action is performed on Div2, the Translation Manager 53 will provide the Translator 54 a chance to translate that action because Div2 is contained in Div1—thus, taking into consideration the hierarchy of the markup element 65, when attempting to match it with a translator. If IdentifyAsContainer, however, is instead set to "False," then the Translation Manager 53 will not give that Translator 54 a chance to translate and actions performed on Div2, and the Translation Manager 53 will only invoke that Translator 54 if an action on "Div1" is performed. This type of mechanism beneficially allows translator authors to control the recording for their custom components depending on their actual structure including hierarchy.

Figure 6:
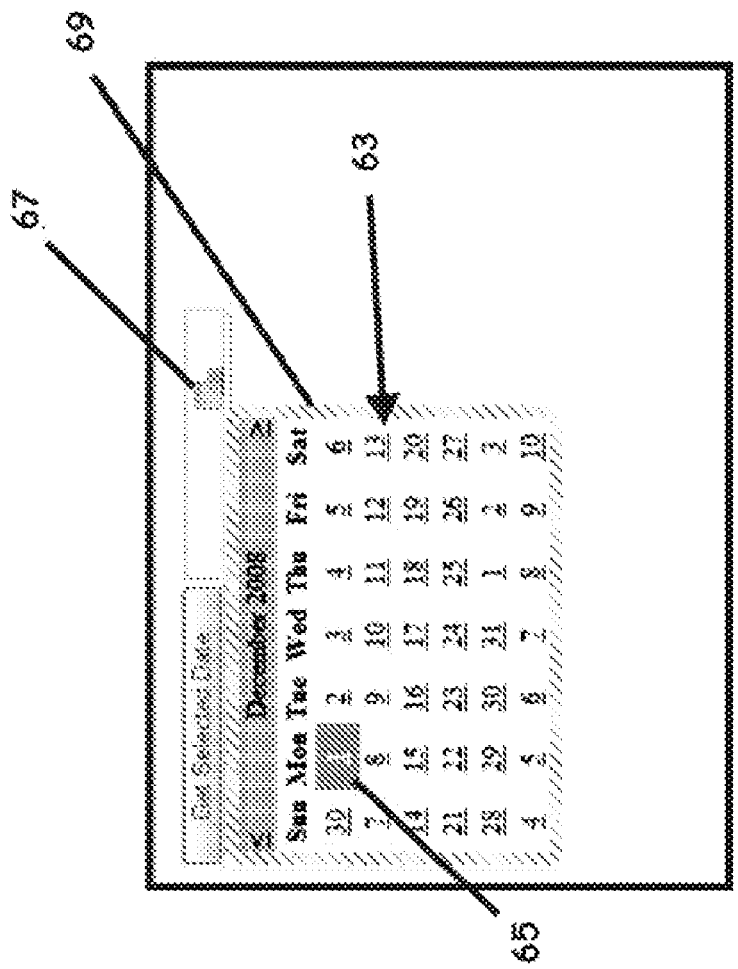
FIG. 6 is a screen shot of a custom visual annotation of a custom component according to an embodiment of the present invention.

This is the same logic that can be used by the AOS 51 to provide visual annotations of an elements 65 belonging to an abstract custom component (e.g., graphical component/structure 63). As the user moves the pointing device 61 over the AOS 51 which is transposed on top of the application being tested, the AOS 51 is constantly detecting the element 65 under the pointing device 61 and calling the Translation Manager 53 to ask it to match it against a custom Translator 54 that it might belong to. If one is found, the AOS 51, in addition to annotating the element 65 directly under the pointing device 61, will also detect and annotate the custom component 63 that this element 65 belongs to, responsive to positioning the pointing device 61 anywhere within that component 63, by asking the matched IControlLocator of the custom component Translator 54 for the IdentifyColor, IdentifyIcon of that Translator 54. It will then annotate that component 63 as shown, for example, in FIG. 6. If an IControlLocator does not define an IdentifyColor or IdentifyIcon, then the IdentifyColor/IdentifyIcon for the containing TranslatorGroup can be used. Note, FIG. 6 illustrates aspects of the visual communication extensibility to include annotating custom components 63, defining custom icons 67, and defining custom colors of the component border 69.

Figure 7:
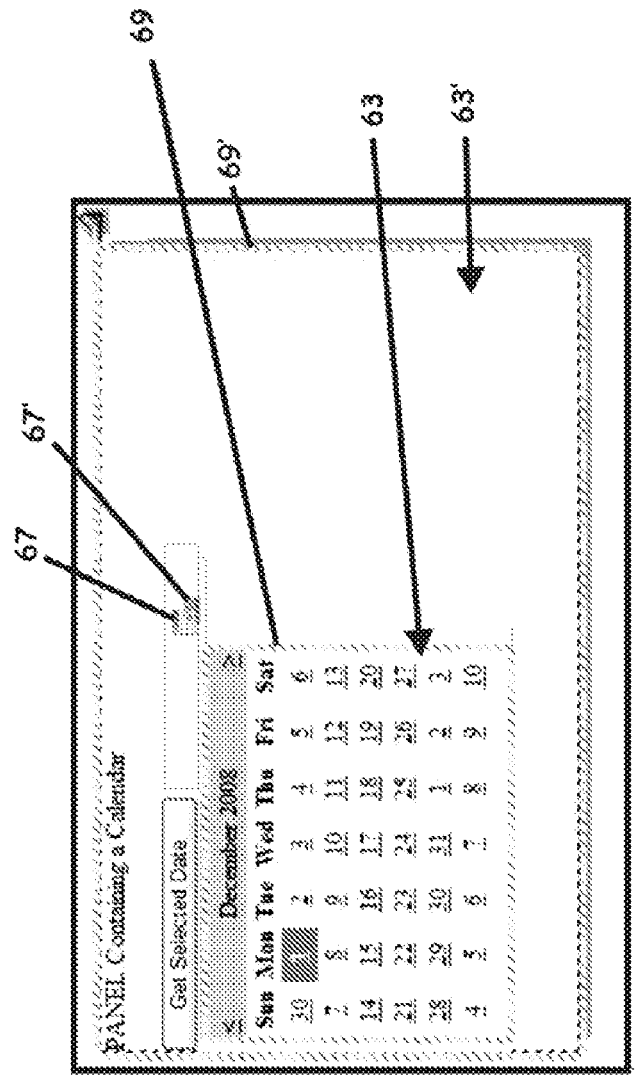
FIG. 7 is a screen shot of a custom visual annotation with custom parent component defined to be annotated according to an embodiment of the present invention.
Figure 8:
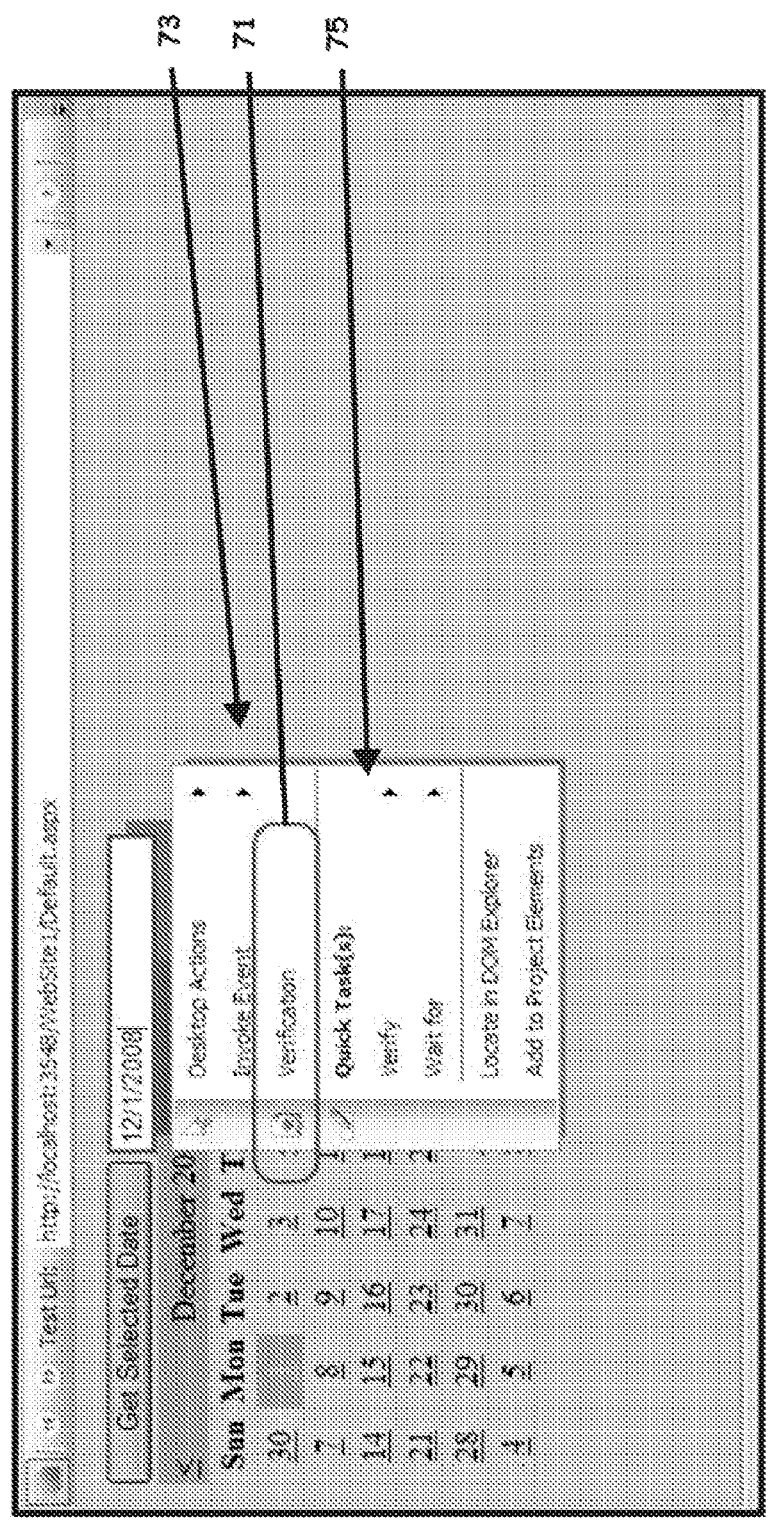
FIG. 8 is a screenshot of a webpage illustrating a Context Sensitive Quick Tasks menu according to an embodiment of the present invention.

Further, if the IControlLocator defines other parent Translators 54 to detect using the ParentLocators[ ] collection, then the Translator 54 will also highlight the parent component(s) 63' on the AOS 51 concurrently as shown in FIG. 7, with each being annotated using its respective IdentifyIcon/IdentifyColor. Note, FIG. 7 illustrates aspects of visual communication extensibility for relational nesting whereby the inter component 63 defines a related parent component 63' to be annotated, wherein the inter component 63 is nested inside a parent component 63' with each component border 69, 69', assigned its own custom color, and each component 63, 63', assigned its own custom icon 67, 67'.

According to the preferred configuration, once the IControlLocator interface is implemented, a Translator 54 can then implement any or all of the following interfaces:

IActionTranslator

```
public interface IActionTranslator
{
    /// <summary>
    /// Translate a recording command from the Orchestrator.
    If you can't translate it, return false,
    /// else true.
    /// </summary>
    /// <param name="translatorLocatorElement">The element that
    matched the Locator FindParam</param>
        bool TranslateCommand(Element translatorLocatorElement,
    CapturedCommand command,
            out ActionDescriptor recordedDescriptor);
}
```

If a Captured Command 52 matches a Translator 54 that implements IActionTranslator, then the TranslateCommand is invoked on that interface to try to translate the command. If TranslateCommand returns true, then the recordedDescriptor is registered in the system, e.g., in database 37. Otherwise, the Translation Manager 53 will try to find a different Translator 54. Additionally, the Translation Manager 53 also passes, as part of this interface, the container element 65 that matched in cases where "IdentifyAsContainer" is set to "True." Recall, when "True" is selected, an action is executed on DIV2, DIV1 will be passed as the translatorLocatorElement.

IVerificationProvider

```
/// <summary>
/// Implemented by a Translator or a TranslatorGroup to offer
/// extensible specialized verification rules to the designer.
/// </summary>
public interface IVerificationProvider
{
    /// <summary>
    /// Get the UI Verification descriptor type that this provider is offering.
    /// </summary>
    /// <returns>An array of rules</returns>
    Type[ ] GetVerifications( );
}
```

If a Translator 54 implements the IVerificationProvider and "Verification" 71 is clicked on the context menu 73 (see FIG. 8) and the Translation Manager 53 matches that Translator 54, then it will call GetVerifications( ) on this interface to return all the verifications available for that element 65. These will be of type VerificationDescriptor and are then shown in the Sentence Based verification (see FIGS. 9-12) to be edited by the user, described in more detail below.

```
    /// <summary>
    /// This interface is implemented on Verification descriptors
    /// to add synchronization support to them.
    /// </summary>
    public interface ISync
    {
        /// <summary>
        /// Perform the wait.
        /// </summary>
        /// <param name="activeBrowser">The active browser</param>
        /// <exception cref="System.TimeoutException"></exception>
        void Wait(Browser activeBrowser);
    }
```

If a VerificationDescriptor implements the ISync interface, then the verification defined by the VerificationDescriptor including the action and script generation logic can also be re-used for synchronization. Synchronization re-uses the logic of the VerificationDescriptors by simply waiting until the VerificationDescriptor passes or fails for a specified timeout.

Embodiments of the present invention also provide a Context Sensitive Quick Tasks (CCQT) selection. As perhaps best shown in FIGS. 8 and 12, when a user right-clicks on an element 65 in (overlaid by) the Automation Overlay Surface 51, the Translation Manager 53 is invoked and attempts to find a Translator 54 for that element 65, are made. If one is found, the Verification provider is queried for the IVerificationProvider interfaces implemented on the respective Translator 54 (if any) and its parent group (if any). Then for each Automation Descriptor 55 in the returned list of Automation Descriptors 55, the system checks if the IQuickTasks interface is implemented on each. If implemented, GetQuickTasks( ) is called on that interface, and for each IQuickTask that it returns a sub-context menu is added under "Quick Tasks" located in the Quick Tasks menu 75 as displayed in FIG. 12. Each IQuickTask is queried for its "Role" property which can be one of the following values:

```
/// <summary>
/// The role of a quick task
/// </summary>
public enum QuickTaskRole
{
  WaitOnly,
  VerificationOnly,
  WaitAndVerification,
}
```

If the Role returns VerificationOnly, a quick task under "Verify . . ." is added only. If it returns WaitOnly, then a quick task under "Wait for . . . " is added only. If it returns WaitAndVerification, then a task is added under "Verify . . . " and "Wait for. . . . "

According to a preferred configuration, the IQuickTasks interface is defined as follows:

```
/// <summary>
/// Implemented by descriptors to get a list of quick tasks
/// </summary>
public interface IQuickTasks
{
  IQuickTask[ ] GetQuickTasks( );
}
/// <summary>
/// Implemented by a descriptor to indicate that it supports
/// a quick task. Quick tasks are shown on the context menu on the
/// overlay surface when an element is right-clicked.
/// </summary>
public interface IQuickTask
{
  /// <summary>
  /// The role of the quick task. This will determine which
  /// menu this task will show up under
  /// </summary>
  QuickTaskRole Role { get; }
  /// <summary>
  /// Initialize the quick task to the current element
  /// </summary>
  /// <param name="currentElement">The current element to
  build the quick task for</param>
  /// <returns>True/False whether a quick task for this element should
  be included.</returns>
  bool Initialize(Element currentElement);
  /// <summary>
```

-continued

```
/// Gets the automation descriptor
/// </summary>
/// <returns>The automation descriptor.</returns>
AutomationDescriptor GetTask( );
/// <summary>
/// Gets the task display text
/// </summary>
string GetDisplayText( );
}
```

Beneficially, according to an embodiment of the present invention, using the Translator architecture described above, the system 30 can enable a rich context sensitive action recording and verification/Synchronization recordings. The Translation Manager 53, depending on the user action, can invoke the proper Translator 54. The Translator 54 can offer the translated action or possible Verification and Synchronization providers that the user can then edit in the Sentence-Based Verification Editor/Builder UI 81 (see, e.g., FIG. 9), and/or that can be used to populate the Context Sensitive Quick Tasks menu 75 (see, e.g., FIG. 8). This same architecture can be used to add custom Translators 54 that offer richer and higher level abstraction for certain components 63. The Translators 54 can define their own custom actions, verifications and/or synchronizations, and their own visual annotations using the IControlLocator, ActionDescriptor, VerificationDescriptor, accordingly. By implementing the IActionTranslator, IVerificationProvider and/or ISync the Translator 54 can expose these custom actions, verification and/or synchronizations to the users, and allow them to be persisted as part of the recorded scenario. For example, in the above sample, one can provide a Translator 54 that, instead of merely recording "Click Link" in response to clicking December $1^{st}$, can abstract out the internals of the calendar object shown in FIGS. 4-5, and record a high-level action that describes it at the calendar level, i.e., "Select Date," or in this example, "Click a_December_01."

ILLUSTRATIVE EXAMPLES

Figure 4:
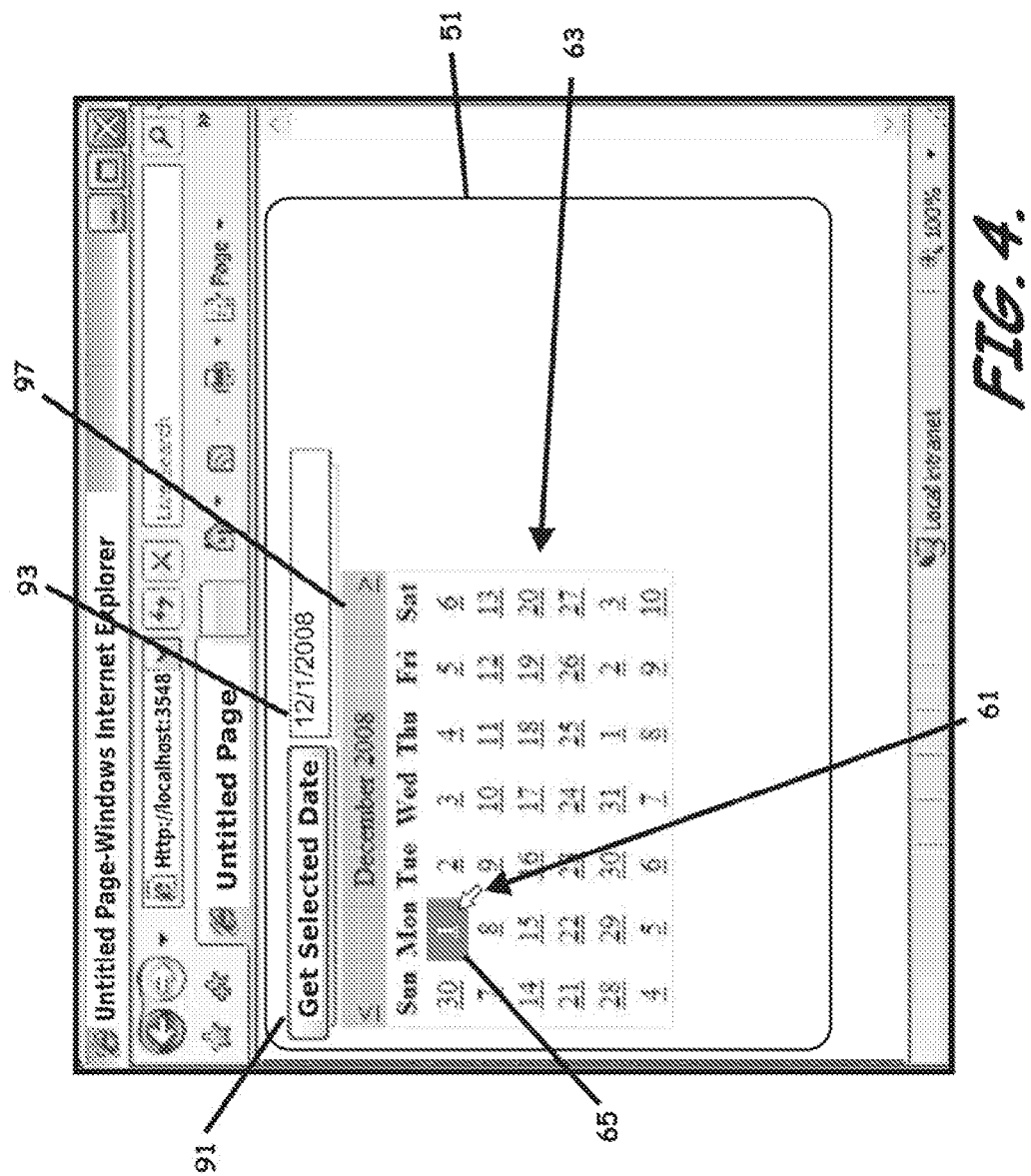
FIG. 4 is a screenshot of a webpage illustrating a simple markup application.

FIGS. 4-12 provide two practical examples which illustrates how the Automation Overlay Surface 51, Context Sensitive Quick Tasks, and Sentence Based verification enables easy automation. FIG. 4 shows a simple markup application that contains a calendar HTML component/structure 63, a button 91 and a text box 93. Note, Appendix 1 provides the actual rendered markup of this application in order to illustrate how significant and complex the markup can be for even a simple application. The term "markup" generally refers to syntactically delimited characters added to the data of a document to represent its structure. There are four different kinds of markup: descriptive markup (tags), references, markup declarations, and processing instructions.

Example 1

Figure 5:
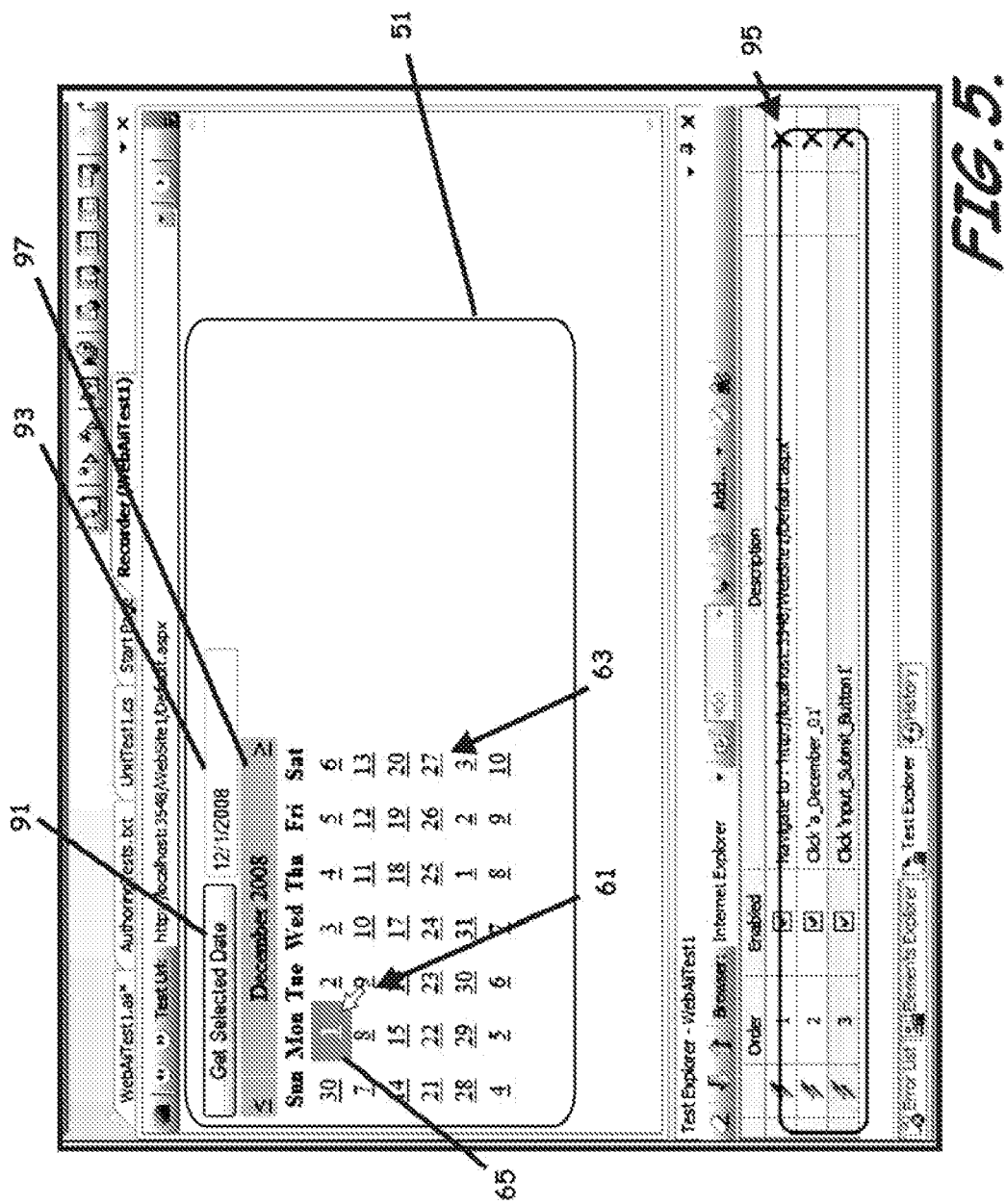
FIG. 5 is a screenshot of a webpage illustrating an action description formation according to an embodiment of the present invention.

As shown in FIG. 5, when the "get selected date" button 91 is clicked, the selected date in the calendar (here, Dec. 1, 2008) is displayed in the text box 93. In order to record an automated script using embodiments of the system 30, after causing the application testing program product 47 to be invoked (referred to as launching the GUI), the user can navigate the displayed structure (calendar) to perform the following:

1. Select December 1st element 65 in the calendar component/structure 63.
2. Click the "Get Selected Date" button 91.
3. Verify that the selected date in the text box 93 is actually "Dec. 1, 2008."

Figure 9:
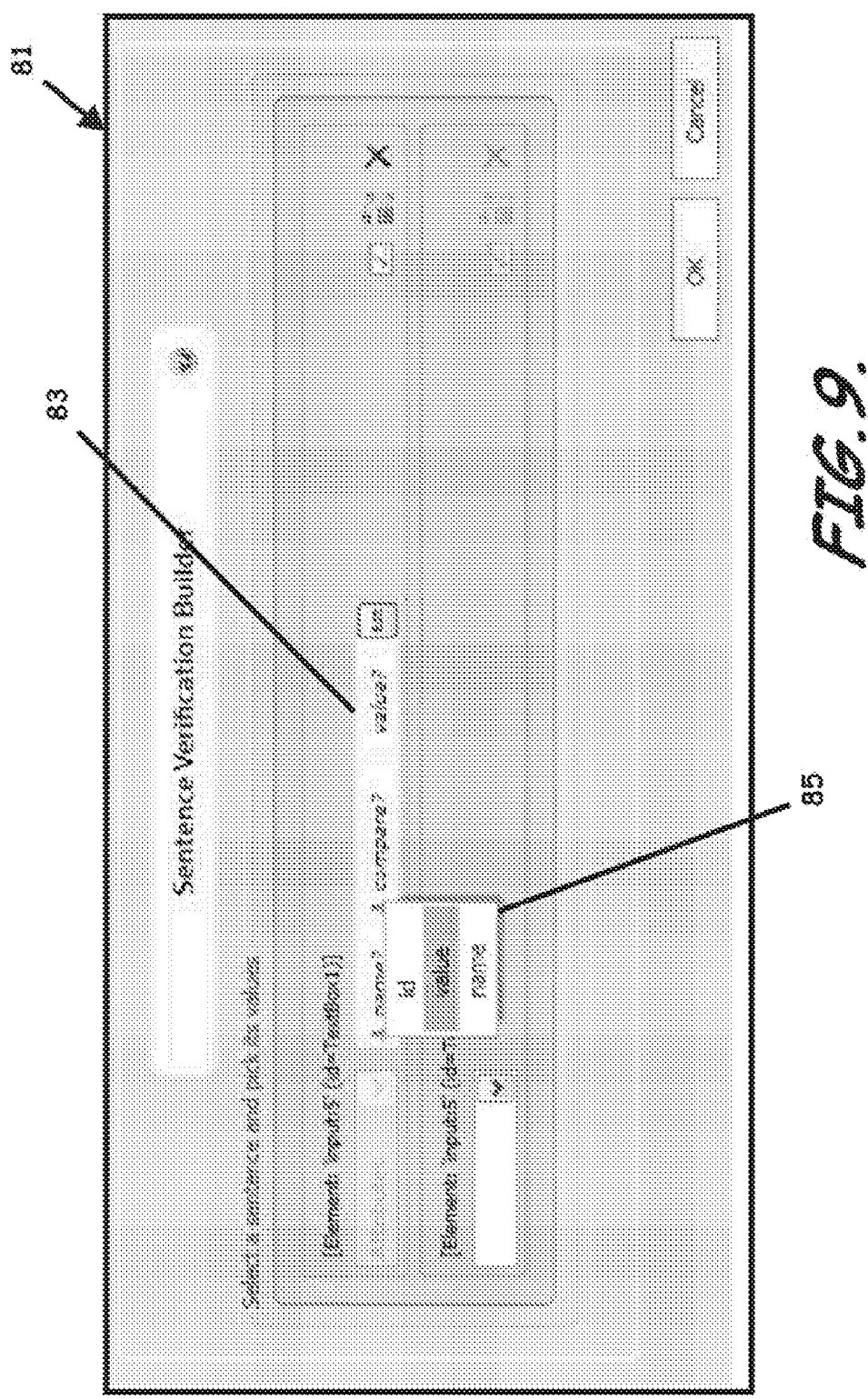
FIGS. 9-11 are screenshots of a portion of a webpage illustrating a Sentence-Based ("SB") verification editor menu according to an embodiment of the present invention.

Specifically, as perhaps best shown in FIG. 5, if the user clicks on the December 1st element 65 and then clicks on the "Get Selected Date" button 91, the first two simple actions are automatically recorded as shown in the action description section 95 of the illustrated graphical user interface (GUI). To record the last step (the validation step) the user hovers the mouse pointer 61 over the TextBox 93 using the Automation Overlay Surface 51 and, for example, right-clicks to show the available context menu 73 (see FIG. 8). Still referring to FIG. 6, the user clicks the "Verification" 71 which automatically opens up the Sentence-Based Verification Editor/Builder UI screen 81 (see FIG. 9). As shown in FIG. 9, each piece of the sentence 83 provides a context menu 85 of options.

Figure 10:
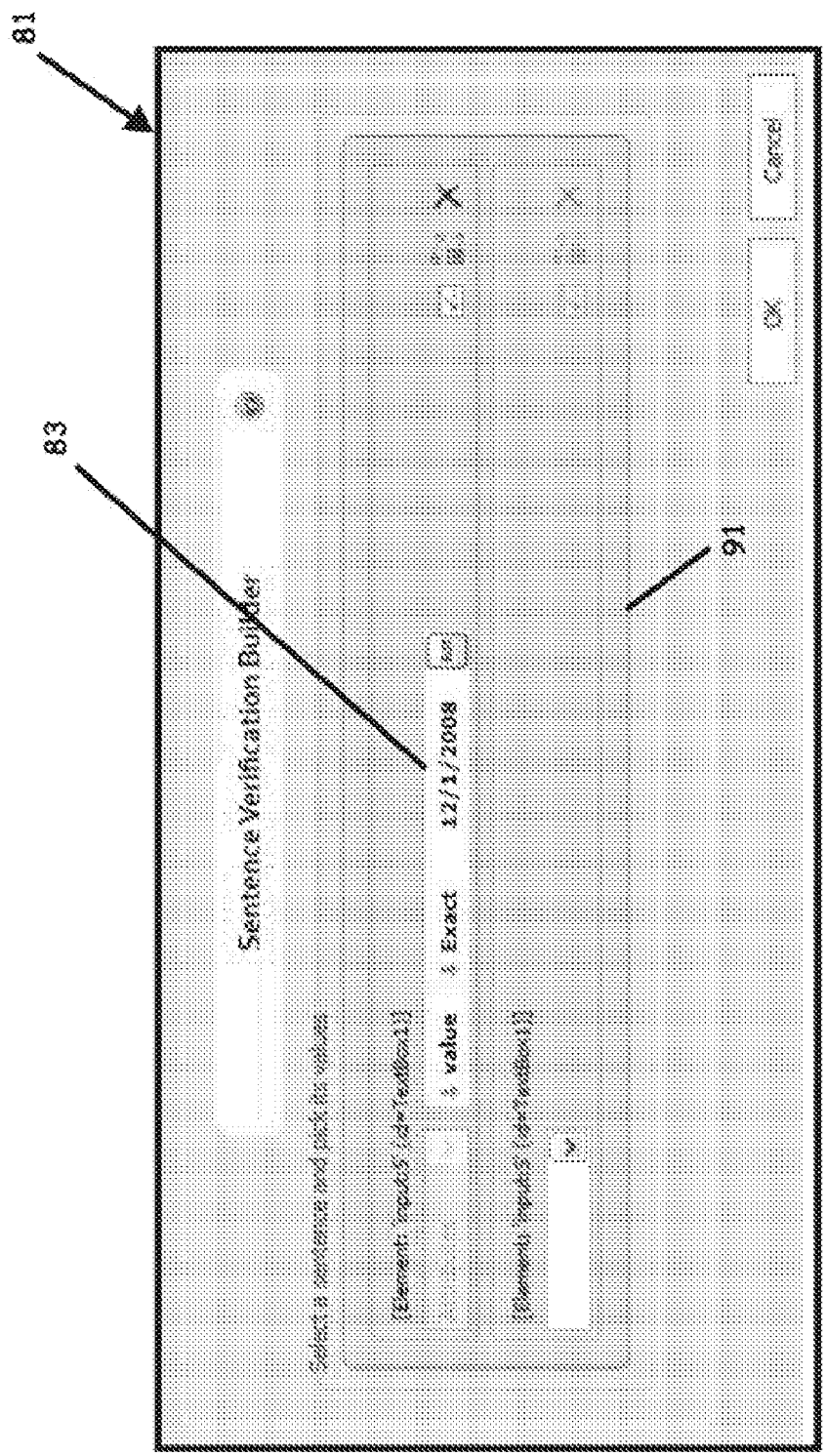
Figure 11:
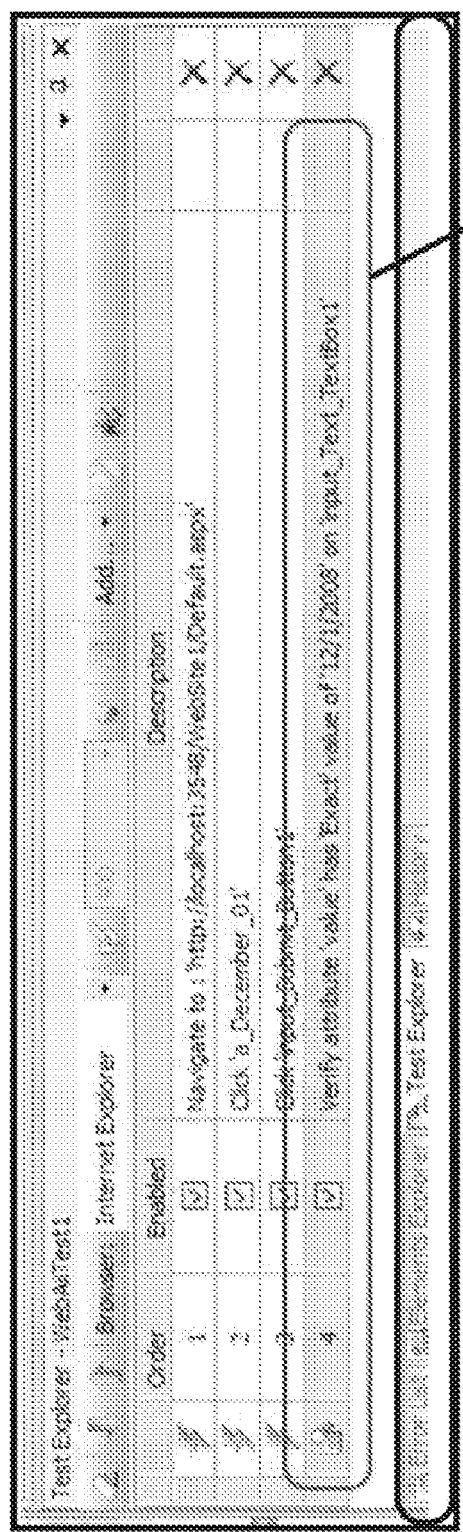
Figure 12:
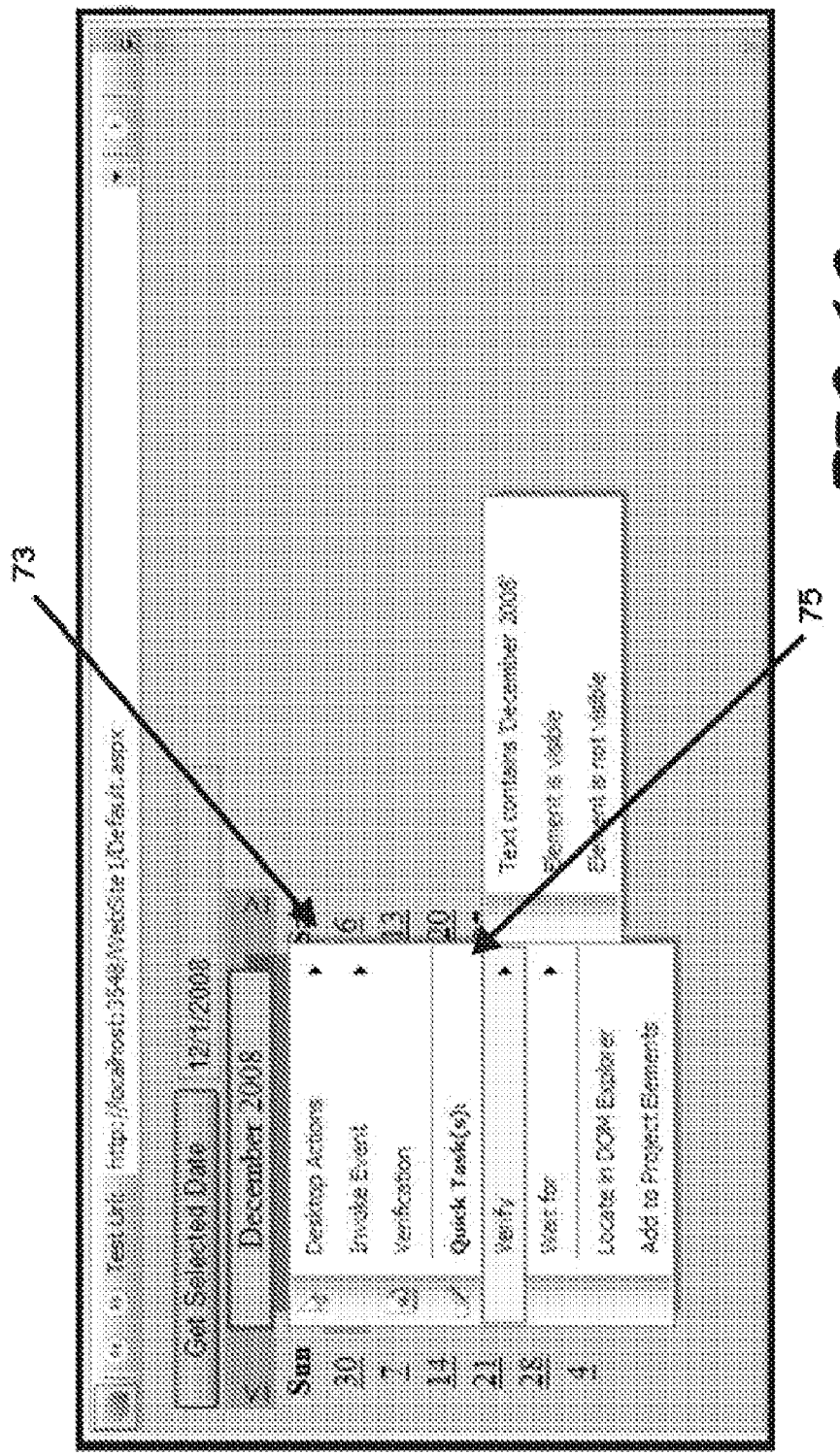
FIG. 12 is a screenshot of a webpage illustrating "Quick Tasks" selection in a Context Sensitive Quick Tasks ("CSQT") menu according to an embodiment of the present invention.

For example, as shown in FIG. 10, the user in this example has selected the "Attributes" verification sentence 83. This sentence 83 contains three Words: (1) attribute to verify (2) the compare type (3) the value to compare it against. The system already filled all possible options for the target element 65 for each word. The user simply picks attribute to verify, which in this illustrative example is the word "value," and the last word is automatically filled with the actual value. The user then simply needs to finish up the sentence by selecting the compare type. In this illustrative example, the user selected "Exact". Now the sentence 83 is "Value Exact Dec. 1, 2008 . . . " which is what the user wants to verify.

According to an embodiment of the present invention, in response to the right-click over a target element 65 and selection of "Verification" 71, each verification sentence 83 is customized against the target element 65 right-clicked upon and is pre-populated with pre-defined element specific options. Beneficially, there is no need for the user to learn the properties and methods of an element 65, as it is provided to the user by the Sentence-Based Verification Editor/Builder UI 81. Once the user clicks OK, the verification 99 is automatically recorded (see FIG. 11).

Example 2

In this example, the user now wants to also verify that the calendar of FIG. 4 is showing "December 2008." That is, the user wants to verify that "December 2008" is showing in the table 97 that represents the calendar component/structure 63. The user first enables the Automation Overlay Surface ("AOS") 51 and hovers over "December 2008" and then, for example, right-clicks "December 2008." The Context Sensitive Quick Tasks are shown (see FIG. 12) and under the "Quick Tasks" menu 75 section of the context menu 73. A set of custom verification tasks that can be recorded are also shown. According to an embodiment of the system 30, the "Quick Tasks" are generally the relatively simple and/or common (default) tasks selected for inclusion as being those that users usually are most likely to want to record against the specific type of target element 65 selected by the user. That is, the user beneficially can simply selects the default "Verify . . . " "Text contains 'December 2008'" and automatically records that action without having to go into the Sentence-Based Verification Editor/Builder. This type of Context Sensitive Quick Tasks enable common scenarios to be executed quickly and efficiently without having to be aware of the element, its type or its internal properties.

Example 3

In this example, the user can now use the extensibility model provided by an embodiment of the present invention to abstract out the calendar component/structure 63 shown in the previous two examples to perform recording and verification at a higher-level abstraction without the need for the end-user to drill down and understand the underlying markup of the calendar control shown in Appendix 1. The previous two examples illustrated recording against the atomic elements 65 that are parts of the complex markup of the calendar structure 63.

The example demonstrates abstracting and enabling the following three high-level actions, verification and synchronizations that are intrinsic to the calendar component 63:
  i. Select a Date.
  ii. Verify selected year is a leap year.
  iii. Wait for the selected year to be a leap year.

Performing the actions above by targeting the raw atomic elements 65 that make up the calendar is a tedious task and requires intimate knowledge of how the calendar is rendered on the part of the end user.

The first step in abstracting out the calendar component 63 includes implementing an IControlLocator object that defines Locators that can detect a calendar entity on the display page. In this example, the title attribute that has a value "Calendar" is used to detect a calendar component/structure 63.

```
<table id="Calendar1" cellspacing="0" cellpadding="2"
title="Calendar" border="0" style="border-width:
1px; border-style: solid; border-collapse: collapse;">
```

Below is the implementation of the IControlLocator for the calendar component/structure 63.

```
/// <summary>
/// Whether to identify this control as a container.
///
/// When this is set to true, any action on an element on the pace that
has a parent that matches any of the FindParams defined
/// by Locators[ ], this object's IActionTranslator.TranslateCommand
will be called.
///
/// If set to 'false'. Only if the element under the action itself matches
one of the FindParams[ ] this TranslateCommand will be
/// called.
///
/// Example:
/// Assume the Locators array matches all tables on an HTML page
/// if (IdentifyAsContainer) is true, then if you click (or perform an
action) on any cell in any table on the page, this translator will
be called.
/// if (IdentifyAsContainer) is false, then this translator will be called
only if an action is performed on the actual table tag only and not
its children
///
/// Note: Most of the time this is set to true since in the case of complex
html control, most of the actions are done on its container tags.
/// </summary>
public override bool IdentifyAsContainer
{
  get { return true; }
}
/// <summary>
/// Gets any parent locators to be identified too
/// </summary>
public override Type[ ] ParentLocators
{
  get
  {
    return new Type[ ] { typeof(PanelLocator) };
  }
}
```

```
    /// <summary>
    /// The highlight color when the surface detects this translator
    /// </summary>
    public override System.Drawing.Color IdentifyColor
    {
      get
      {
        return System.Drawing.Color.Pink;
      }
    }
    /// <summary>
    /// The icon image to display when the surface detects this translator
    /// </summary>
    public override System.Drawing.Image IdentifyIcon
    {
      get
      {
        return Properties.Resources.CalendarIcon;
      }
    }
    /// <summary>
    /// The locators that associate this translator with an Html element
    /// on the page.
    /// These FindParams define unique identifiers of this control.
    /// More info on FindParams:
http://www.artoftest.com/Resources/WebAii/Documentation/
topicsindex.aspx?topic=elementid {Scroll down to
'FindParam objects' topic}
    /// </summary>
    public override FindParam[ ] Locators
    {
      get
      {
        if (__findParams == null)
        {
          FindParam locator = new FindParam("title=~calendar");
          locator.TagName = "table";
          __findParams = new FindParam[ ] { locator };
        }
        return __findParams;
      }
    }
    /// <summary>
    /// A name to give this translator
    /// </summary>
    public override string Name
    {
      get { return "CalendarTranslator"; }
    }
```

The above identified locator informs the AOS 51 how to match and detect the calendar component 63 on the page. The above identified locator also enables custom annotation for this component 63 on the AOS 51 as shown in FIG. 6 including custom identification icon and border color.

Further, the above identified translator defines other custom components 63' to be annotated on the AOS 51. The above example illustrates the calendar component 63 defining the "PanelLocator" as second custom component 63' to be detected and visually annotated on the AOS 51 when the calendar component 63 falls inside it (nested inside it) as shown in FIG. 7.

The system has defined how to detect a calendar component 63 including its annotation (e.g., custom color for component border 69). As such, the system can define an action "Select Date." To do so, the system first defines an ActionDescriptor that defines that action including data it needs to persist, execute, and generate scripts. The following is an ActionDescriptor for the SelectDate action for the calendar component 63.

```
namespace AspNetTranslators
{
  /// <summary>
  /// A Calendar Navigation Descriptor.
  /// This class encapsulates some high level calendar action logic.
  /// </summary>
  [Serializable] // This is needed when executing tests using VSTS and MSTEST.
  [DataContract] // We use WCF Xml Serialization to persist this descriptor to disk.
  public class CalendarNavigationDescriptor : ActionDescriptor
  {
    #region [ Private Fields ]
    /// <summary>
    /// The navigation type to perform.
    /// </summary>
    private CalendarNavigationType __navigationType;
    /// <summary>
    /// The date to select when CalendarNavigationType=SelectDate
    /// </summary>
    private DateTime __selectDate;
    #endregion
    #region [ Constructor ]
    /// <summary>
    /// Create a new navigation descriptor
    /// </summary>
    /// <param name="myCalendar">The calendar element.</param>
    /// <param name="navigationType">The navigation type.</param>
    /// <param name="date">The select date</param>
    public CalendarNavigationDescriptor(Element myCalendar, CalendarNavigationType navigationType,
        DateTime date)
        : base("calendar", myCalendar) // The myCalendar is the outer most tag that contains the calendar (i.e. the Table tag)
    {
      __navigationType = navigationType;
      __selectDate = date;
    }
    /// <summary>
    /// An empty constructor for serialization.
    /// </summary>
    public CalendarNavigationDescriptor( ) : base( ) { }
```

```
#endregion
/// <summary>
/// Execute this action.
/// This method is called when a test is executed after it has been recorded.
/// </summary>
/// <param name="browser"></param>
public override void Execute(Browser browser)
{
   // 1. Get the calendar object
   //
   // You are garanteed this will always be the same calendar object you added when the descriptor was
   // created. When this descriptor is persisted to disk, the element identification
   // is created and persisted and before this descriptor is created, this collection
   // is initialized back with the elements it had.
   CalendarTestControl calendar = this.Targets["calendar"].As<CalendarTestControl>( );
   // 2. Perform the action
   switch (_navigationType)
   {
      case CalendarNavigationType.GoNextMonth:
         calendar.GoNext( );
         break;
      case CalendarNavigationType.GoPrevMonth:
         calendar.GoPrevious( );
         break;
      case CalendarNavigationType.SelectDate:
         // Given that the SelectedDate supports DataDriven testing, we will use the
         // BindData base method to get the value instead of directly accessing the property.
         calendar.SelectedDay = this.BindData<DateTime>("SelectedDate").Day;
         break;
   }
}
/// <summary>
/// Perform CodeGen for this control actions.
/// </summary>
public override void ToCode( )
{
   // Add code comment description
   this.TestMethod.Statements.Add(new System.CodeDom.CodeCommentStatement(FriendlyDescription));
   // CodeGen the actions
   switch (_navigationType)
   {
      case CalendarNavigationType.GoNextMonth:
         // Get my element (key:Calendar), cast it to type (CalendarControlWrapper) and then
         // invoke the GoNextMonth on it.
         this.InvokeMethod("calendar", typeof(CalendarTestControl), true, "GoNextMonth");
         break;
      case CalendarNavigationType.GoPrevMonth:
         this.InvokeMethod("calendar", typeof(CalendarTestControl), true, "GoPrevMonth");
         break;
      case CalendarNavigationType.SelectDate:
         // Note the this.BindDataCode("propertyName") that allows you
         // to generate code that is Data Driven aware.
         this.SetProperty("calendar", typeof(CalendarTestControl), this.BindDataCode("SelectedDay"));
         break;
   }
}
/// <summary>
/// A friendly description to show in the TestExplorer
/// </summary>
public override string FriendlyDescription
{
   get
   {
      return string.Format("Calendar:Navigate -> '{0}'", _navigationType.ToString( ));
   }
}
/// <summary>
/// Gets or sets the NavigationType.
/// </summary>
[DataMember] // Persist this property to disk [Properties marked with DataMember must have a setter too]
public CalendarNavigationType NavigationType
{
   get
   {
      return _navigationType;
   }
   set
   {
      _navigationType = value;
      SetReadOnlyProperties( );
```

```
        OnPropertyChanged("NavigationType"); // To notify the UI and mark the test dirty.
      }
    }
  }
  /// <summary>
  /// Gets or sets the SelectData
  /// </summary>
  [DataMember] // Persist this property to disk. [Properties marked with DataMember must have a setter too]
  public DateTime SelectedDate
  {
    get
    {
      return _selectDate;
    }
    set
    {
      _selectDate = value;
      OnPropertyChanged("SelectedDate");
    }
  }
  [DataDriven] // Make this property data driven
  public int SelectedDay
  {
    get
    {
      return _selectDate.Day;
    }
  }
  // You can use the DynamicReadOnlyProperties collection to dynamically make certain
  // properties readonly in the properties grid when they no longer apply.
  private void SetReadOnlyProperties( )
  {
    if {_navigationType != CalendarNavigationType.SelectDate)
    {
      // Given that the verification here is for a day selection, then
      // disable the leap year verification
      this.DynamicReadOnlyProperties["SetectedDate"] = true;
    }
  }
 }
}
```

As shown above, the ActionDescriptor contains information regarding how to execute, generate script, and persist this action to a persistent medium.

The system further implements the translation logic that will translate an actual CapturedCommand that is the result of the User's selection of a date to this ActionDescriptor. To perform this function, the system implements the IAction-Translator on the Translator 54. As shown below, the Translate( ) function abstracts the logic to translate a Captured-Command and returns the ActionDescriptor that represents that action. As show in FIG. 13, this function abstracts out the intimate knowledge of the calendar control from the end user shown in the action description section 95, to record it against the abstract calendar component 63.

The element "translatorLocatorElement" that is passed in to the calendar descriptor, is the element matched by the locator FindParams 56. The matched element has the entire hierarchy of parents/children and siblings which are provided to enable the Translators to inspect the calendar attributes to determine, for example, the state of the calendar and eventually determine the abstracted action that took place.

```
#region IActionTranslator Members
/// <summary>
/// Try to translate a command.
/// </summary>
/// <param name="translatorLocatorElement">The element that matched one of the FindParams[ ]</param>
/// <param name="command">The captured command that contains information
about the action. command.Element is also the action target. In other words
    /// the element that the action was directly executed against (If IdentifyAsContainer is true) this will always be a child of
translatorLocatorElement.</param>
    /// param name="recordedDescriptor">The translated descriptor if the translator was able to interpret the command, else null.</param>
    /// <returns>True if a translation occurred else, false</returns>
    /// <remarks>If you return false, the action is routed to the intrinsic html action translator and and action is recorded on the atomic html
element</remarks>
      public bool TranslateCommand(Element translatorLocatorElement, CapturedCommand
      command, out ActionDescriptor recordedDescriptor)
      {
         recordedDescriptor = null;
         if (command.CommandType.BrowserCommandType == BrowserCommandType.Click)
         {
            // Must be a day select then
```

```
            // For the sake of this sample, we'll assume it is a day select. The Asp.Net calendar supports week/month selections too.
            int dayOut;
            if (Int32.TryParse(command.Element.InnerText, out dayOut))
            {
                // We will use our control wrapper to deduce which day was selected.
                CalendarTestControl cal = translatorLocatorElement.As<CalendarTestControl>( );
                DateTime selectedDay = new DateTime(cal.SelectedYear, cal.SelectedMonth, dayOut);
                recordedDescriptor = new CalendarNavigationDescriptor(translatorLocatorElement, CalendarNavigationType.SelectDate, selectedDay);
                return true;
            }
        }
    // Can't translate this command, return false.
    return false;
    }
```

The system next implements the leap year verification and synchronization. To do so, the system can implement a VerificationDescriptor that can also implement ISync interface, as described below:

```
/// <summary>
/// Define the custom verification that this control will support in the designer.
///
/// NOTE: In this sample we are using one descriptor class to define two types of verification:
/// (Leap Year verification and SelectedDate verification)
/// You can optionally break this into two descriptors for clean separation if you wish.
/// You can create as many verification descriptors as you wish.
/// </summary>
[Serializable] // This is needed when executing tests using VSTS and MSTEST.
[DataContract] // We use WCF Xml Serialization to persist this descriptor to disk.
[RuleEditor("ASP Calendar", typeof(CalendarDateVerificationRuleUI))]
public class CalendarDateVerificationDescriptor : VerificationDescriptor, IQuickTasks, ISync
{
    #region [ Private Fields ]
        /// <summary>
    /// The selected day operator
    /// </summary>
    private SimplyBoolean _isOrIsNot;
    /// <summary>
    // How leap year verification should be done.
    /// </summary>
    private bool _isLeapYear;
    #endregion
    #region [ Constructors ]
    public CalendarDateVerificationDescriptor(Element calendar, bool isleapYear)
        :base("calendar", calendar)
    {
        this.DateVerificationType = DateVerificationType.VerifyLeapYear;
        _isLeapYear = isleapYear;
    }
    /// <summary>
    /// Create a new date verification descriptor [ Always need an empty constructor for serialization ]
    /// </summary>
    public CalendarDateVerificationDescriptor( )
        : base( )
    {
    }
    #endregion
    /// <summary>
    /// Perform the calendar date verification. This method is called when executing this test.
    /// </summary>
    public override void Verify(Browser b)
    {
        CalendarTestControl calendar = this.Targets["calendar"].As<CalendarTestControl>( );
            if (calendar.IsLeapYear != _isLeapYear)
            {
                throw new VerificationException(b, this, "Leap year verification failed", _isLeapYear.ToString( ),
            calendar.IsLeapYear.ToString( ));
            }
            break;
    }
}
/// <summary>
/// Called when the step is converted to code.
```

```
/// </summary>
public override void ToCode( )
{
}
#region [ Public Properties ]
/// <summary>
/// Return a friendly description to display in the Test Explorer.
/// </summary>
public override string FriendlyDescription
{
   get
   {
      // NOTE: this.GetDescriptionPrefix( ) returns "Verify" or "Wait For" depending on the role of this
      // descriptor
      if (_dateVerificationType == DateVerificationType.VerifyLeapYear)
      {
         return string.Format("{0} calendar leap year is '{1}'.", this.GetDescriptionPrefix( ), _isLeapYear.ToString( )):
      }
      else
      {
         return this.FriendlyDescription;
      }
   }
}
[DataMember]
[Description("Whether to verify that the selected day is or is not a certain day.")]
public SimplyBoolean IsOrIsNot
{
   get
   {
      return _isOrIsNot;
   }
   set
   {
      _isOrIsNot = value;
      OnPropertyChanged("IsOrIsNot");
   }
}
[DataMember]
[Description("Whether the year is a leap year")]
public bool IsLeapYear
{
   get
   {
      return _isLeapYear;
   }
   set
   {
      _isLeapYear = value;
      OnPropertyChanged("IsLeapYear");
   }
}
#endregion
#region IQuickTasks Members
/// <summary>
/// Simply return all the verification quick tasks for this descriptor
/// This is used when the user clicks the custom control icon in the designer surface
/// to display the context menu of this control.
/// </summary>
/// <returns>The list of quick tasks to display in the context menu on the surface</returns>
public IQuickTask[ ] GetQuickTasks( )
{
   return new IQuickTask[ ] { new VerifyLeapDayQuickTask( ) };
}
#endregion
#region ISync Members
/// <summary>
/// We will support Waits for this descriptor for synchronization
/// </summary>
/// <param name="activeBrowser"></param>
public void Wait(Browser activeBrowser)
{
   // Simply call into the wait base element since we will be
   // using the same logic as the verification.
   this.PerformWait(activeBrowser);
}
#endregion
}
```

As shown above, the VerificationDescriptor abstracts out the verification of a leap year against the markup language of the calendar control and hides that complexity from the user. Beneficially, the user merely needs to tell the recorder 50 to verify the year to be leap or not and does not have to ascertain or understand the corresponding markup language of the calendar component 63, since it is abstracted for the user.

As noted above the VerificationDescriptor also implements the ISync interface which can allow the designer to use this verification descriptor to also perform synchronization (i.e. wait until the calendar is a leap year or not).

Figure 14:
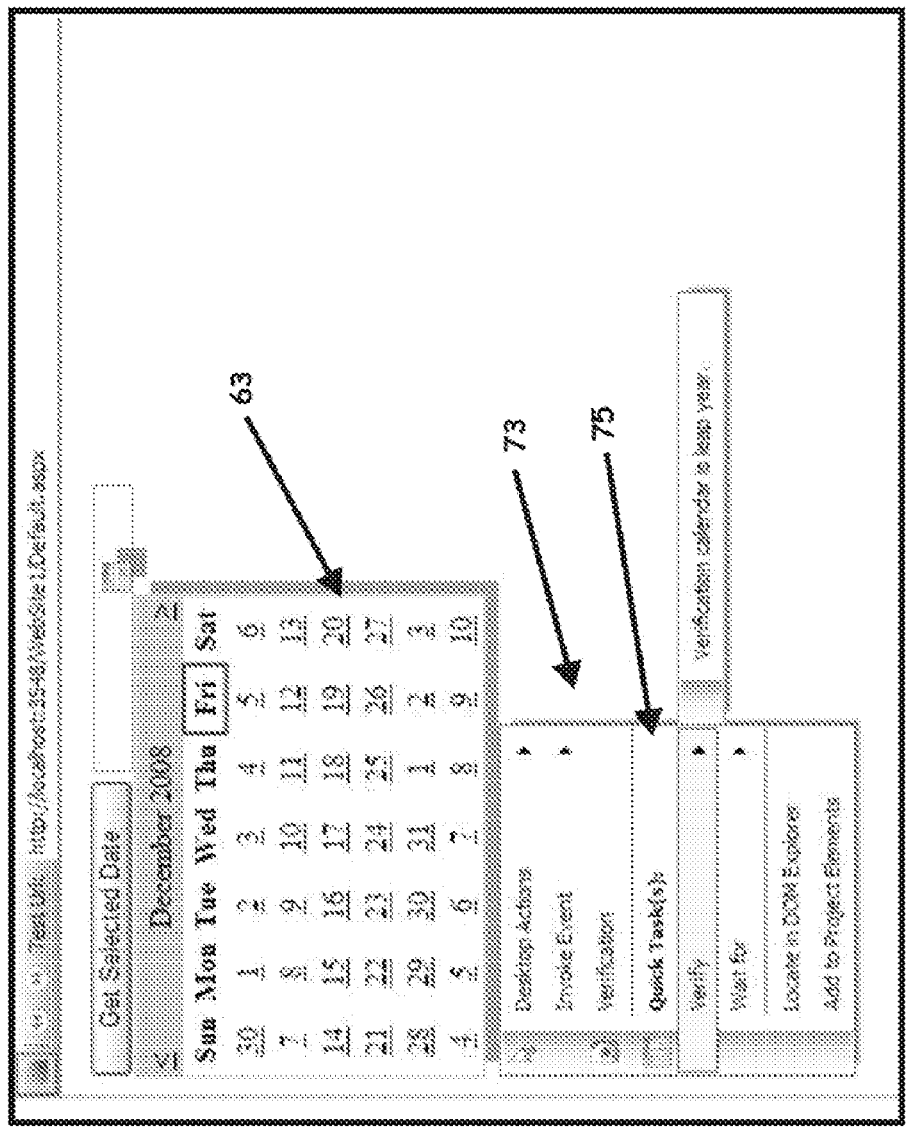
FIG. 14 is a screenshot of a custom Context Sensitive Quick Tasks for a custom component that illustrates the abstracting out of the verification for that specific component according to an embodiment of the present invention.

Now that the system has the VerificationDescriptor, in this example, the user wishes to expose this leap year verification as a "Context Sensitive Quick Task" ("CSQT") on the Quick Tasks menu 75 section of the context menu 73 (see, e.g., FIG. 14). To do so, note the implementation of the IQuickTasks interface which returns VerifyLeapYearQuickTask—an object that implement IQuickTask interface, as follows:

```
namespace AspNetTranslators
{
    /// <summary>
    /// A quick task to validate the leap year. You can provide as many quick tasks as you want.
    /// These will be displayed when the user clicks on this control's Icon in the Recording Surface
    /// </summary>
    public class VerifyLeapYearQuickTask : IQuickTask
    {
        private CalendarTestControl _calendar;
        private bool _isLeapYear = true;
        #region IQuickTask Members
        /// <summary>
        /// This is the text that will be displayed in the context menu.
        /// </summary>
        /// <returns></returns>
        public string GetDisplayText( )
        {
            return string.Format("Verification calendar {0} leap year,",
                _isLeapYear ? "is" : "is not");
        }
        /// <summary>
        /// If this task is selected by the user, the GetTask( ) method will
        /// be called so that we return a verification descriptor to be recorded
        /// </summary>
        /// <returns></returns>
        public AutomationDescriptor GetTask( )
        {
            CalendarDateVerificationDescriptor desc =
                new CalendarDateVerificationDescriptor(_calendar.BaseElement, _isLeapYear);
            return desc;
        }
        /// <summary>
        /// Initialize all information for GetDisplayText and GetTask( );
        /// Note: Initialize( ) is called in a background thread so it doesn't
        /// affect the responsivenss of the UI if it contains a long operation.
        /// Initialize( ) should be designed so that GetDisplayText( ) and GetTask( )
        /// do very little work. All data mining needed should be done in this function for
        /// performance reasons.
        /// </summary>
        /// <param name="currentElement">The actual DOM element to generate QuickTasks for (if possible)</param>
        /// <returns>True/False whether Quick Tasks should be displayed for this element </returns>
        public bool Initialize(Element currentElement)
        {
            try
            {
                _calendar = currentElement.As<CalendarTestControl>( );
                _isLeapYear = _calendar.IsLeapYear;
                // Whether you want to display or not. This enables the quick task to make a
                // decision based on the element.
                return true;
            }
            catch(Exception ex)
            {
                // Something unexpected happened. Log it and move on...
                System.Diagnostics.Trace.Write(ex.ToString( ));
                return false;
            }
        }
        /// <summary>
        /// Defined whether this role should appear under the Wait.For or Verify or both in
        /// Quick Tasks Context Menu
        /// </summary>
        public QuickTaskRole Role
        {
            get { return QuickTaskRole.WaitAndVerification; }
        }
```

```
        #endregion
    }
}
```

Note how the Role returns WaitAndVerification which can allow this quick task to show under both "Verify . . . " and "Wait for . . . " on the menu 75 section of the context menu 73.

Now that the system has the VerificationDescriptor and its associated CSQT defined, the system can implement the IVerificationProvider interface on the Translator 54, as follows:

```
#region IVerificationProvider Members
/// <summary>
/// Return any specific verifications for this control. The verification
descriptors are the ones that
/// define the QuickTasks and the UI for the Verification Sentences.
/// </summary>
/// <returns></returns>
public Type[ ] GetVerifications( )
{
    // You can return as many verifications as you want here. In this
    sample we have only on descriptor.
    return new Type[ ] { typeof(CalendarDateVerificationDescriptor) };
}
#endregion
```

Figure 13:
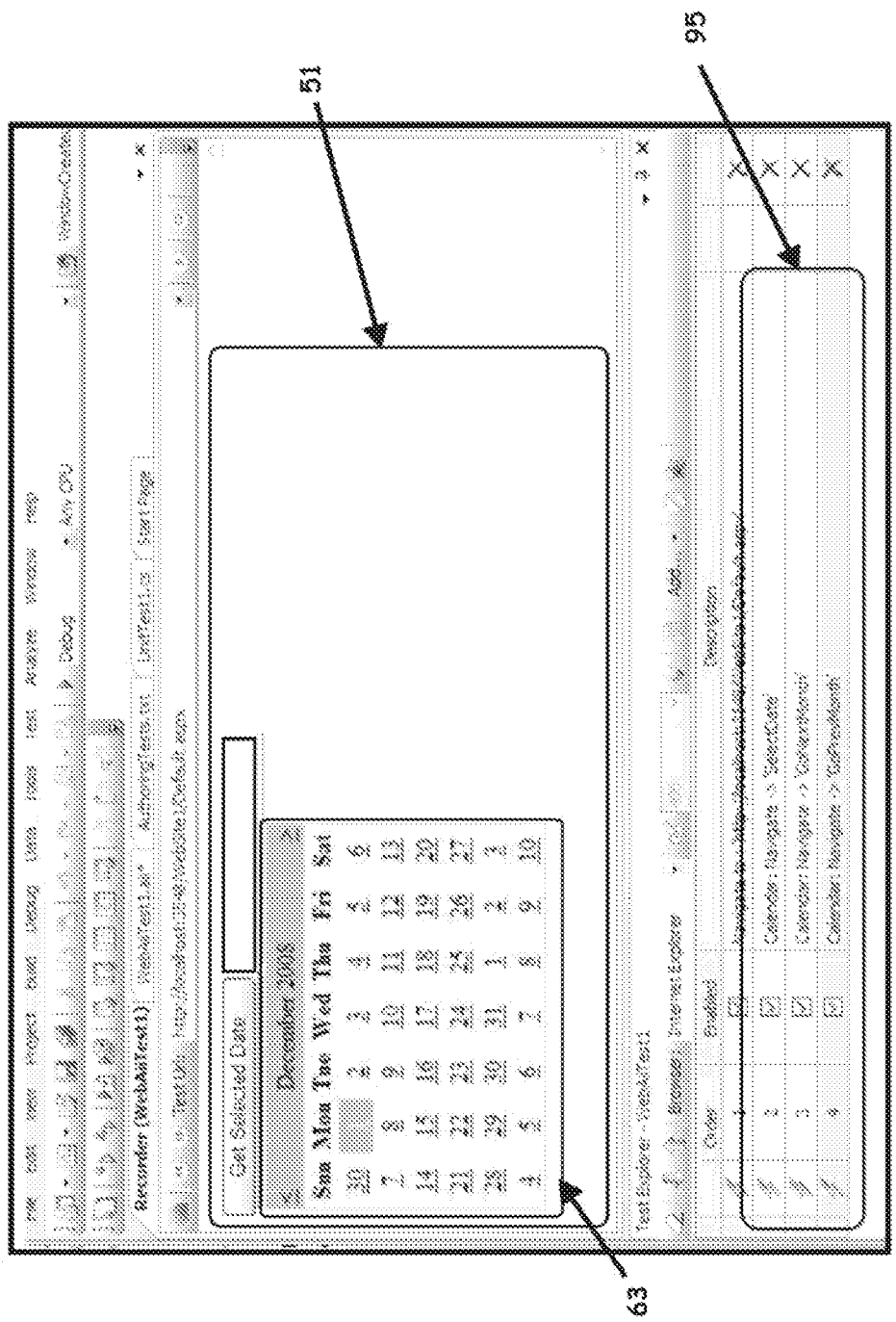
FIG. 13 is a screenshot shown action recording against a custom component that illustrates the abstracting out of the underlying markup of a component to provide the illustrated high-level abstracted actions according to an embodiment of the present invention.

The Translator 54 responsively has all the needed information and can be plugged into the recorder 50 to offer recording against the Calendar control as shown in FIGS. 13-14.

Example 4

Figure 15:
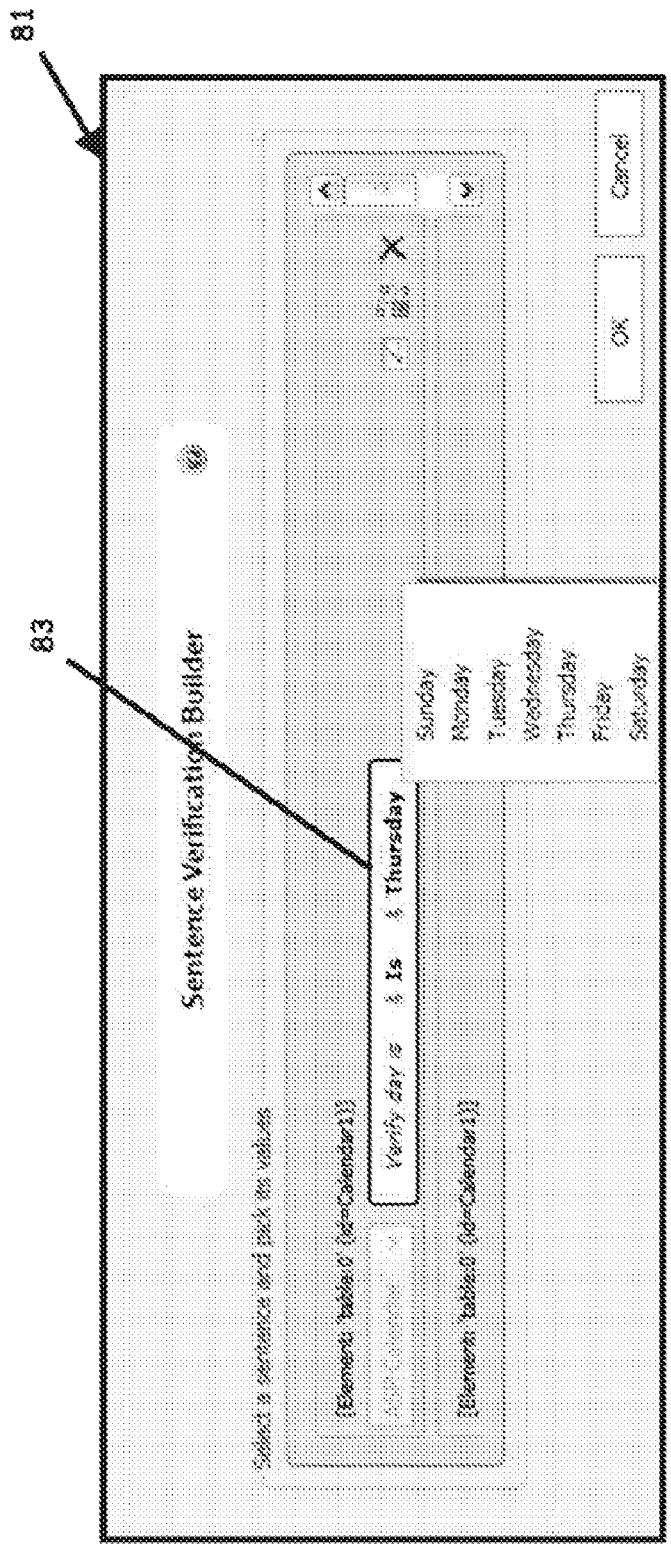
FIG. 15 is a screenshot of a custom component illustrating the extension of the Sentence-Based User Interface through customization of the verification by the user, abstracting out the verification at a higher level according to an embodiment of the present invention.
Figure 16:
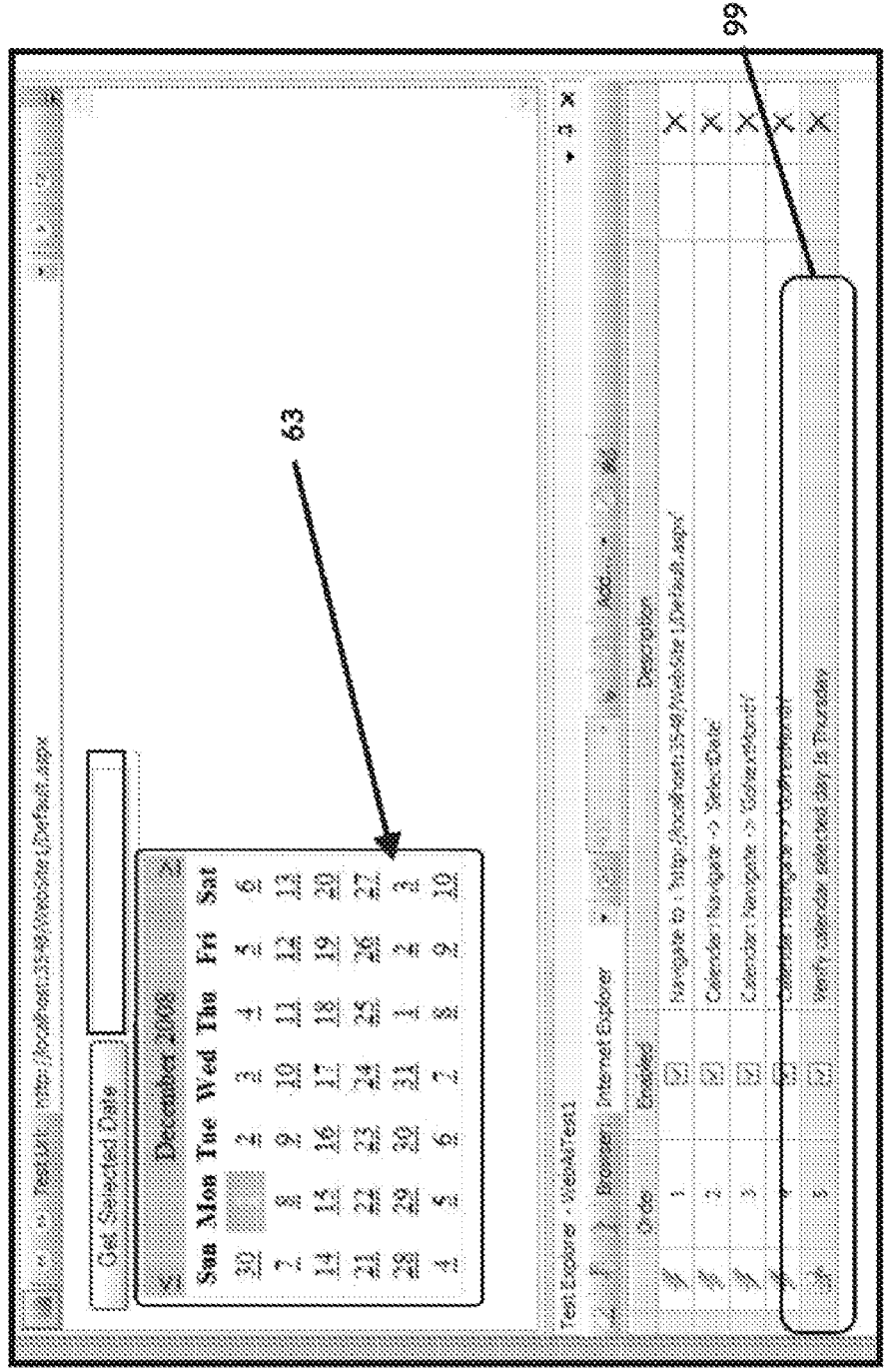
FIG. 16 is a screenshot of a custom component illustrating the results of the sentence-based abstraction of the verification according to an embodiment of the present invention.

This Example illustrates how to extend the "Sentence Based" Verification for the alendar component/structure 63 as presented in FIGS. 15-16. In this example a verification is implemented that reads:

Verify day (is/isnot?), (day of week?)

The two underlined parts above are the words that are configurable by the Sentence-Based User Interface or "SB UI" 81. The first step in defining a "SB" UI is to implement a VerificationDescriptor as shown above for a verification. Assuming the existence of a VerificationDescriptor, the system can simply mark that descriptor with the RuleEditor attribute which notified the "SB" editor, as shown below, for example:

[RuleEditor("ASP Calendar", typeof(CalendarDateVerificationRuleUI))]

The attribute above defines the object that will be responsible in defining the UI for the sentence and its parts, which in this example, is the CalendarDateVerificationRuleUI.

The CalendarDateVerificationRuleUI is then defined, as follows:

```
namespace AspNetTranslators
{
    //
    // Note: The RuleUI supports offline scenarios. [I.e editing verification rules without the page being loaded.
    // When the page is loaded the this.TargetElement can always be accessed to provide real time information to
    // guide the tester in crafting verification. You should always check the this._withoutElement property to
    // figure out whether you have an element or you are running in offline mode.
    // In offline mode the RuleParameterValueChanged event on all parameters is disabled.
    //
    /// <summary>
    /// Rule to allow editing for a sentence: "Verify selected date is {0}' where 0: can be Mon/Tue/Wed..."
    /// This rule is displayed as an option when the user selects Verification from the context menu of this control.
    /// </summary>
    public class CalendarDateVerificationRuleUI : RuleEditor<CalendarDateVerificationDecriptor>
    {
        /// <summary>
        /// The static portion of the rule.
        /// </summary>
        private StaticStringParameter _staticSentence;
        /// <summary>
        /// The $day portion
        /// </summary>
        private RuleParameterEditor<SimplyBoolean> _operator;
        private RuleParameterEditor<DayOfWeek> _dayOfWeekParameter;
        #region RuleEditor Members
        public override string ElementTargetsKey
        {
            // The key used by your CalendarVerificationDescriptor
            get { return "calendar"; }
        }
        /// <summary>
        /// Initialize the UI with an existing descriptor. Sentence Load case
        /// </summary>
        /// <param name="descriptor"></param>
        public override void InitDescriptor(CalendarDateVerificationDescriptor descriptor)
        {
            // Initialize the parameters with an existing descriptor.
            _dayOfWeekParameter.SelectedValue = descriptor.DayOfWeek;
            _operator.SelectedValue = descriptor.IsOrIsNot;
        }
```

```
/// <summary>
/// Initialize the sentence UI with the different parameter pieces.
/// </summary>
/// <param name="element">The element object that we are targetting.</param>
/// <param name="withoutElement">withoutElement indicates that the element object is null. This is the case when loading
/// the verification rule without the active page running. Offline editing scenarios.</param>
/// <returns>Return the list of paramters to use.</returns>
public override IRuleParameter[ ] InitParams(Element element, bool withoutElement)
{
    _staticSentence = new StaticStringParameter("Verify day is");
    _operator = new RuleParameterEditor<SimplyBoolean>("is or not?");
    _operator.RuleParameterValueChanged += new
EventHandler<RuleParameterValueChangedEventArgs<SimplyBoolean>>(_operator_RuleParameterValueChanged);
    _dayOfWeekParameter = new RuleParameterEditor<DayOfWeek>("Day?");
    return new IRuleParameter[ ] { _staticSentence,_operator, _dayOfWeekParameter };
}
/// <summary>
/// When the Is/IsNot is selected, go ahead an update the actual date for the user
/// </summary>
/// <param name="sender"></param>
/// <param name="e"></param>
void _operator_RuleParameterValueChanged(object sender, RuleParameterValueChangedEventArgs<SimplyBoolean> e)
{
    try
    {
        _dayOfWeekParameter.SelectedValue = this.TargetElement.As<CalendarTestControl>( ).SelectedDayOfWeek;
    }
    catch
    {
        // No date is selected. Can't really help the user define one. They will need to select one.
    }
}
/// <summary>
/// Persiste the UI into a descriptor
/// </summary>
/// <param name="descriptor"></param>
public override void SaveDescriptor(ref CalendarDateVerificationDescriptor descriptor)
{
    // It is garanteed that before SaveDescriptor is called, the Validate( ) method is called.
    descriptor.DateVerificationType = DateVerificationType.VerifySelectedDate;
    descriptor.DayOfWeek = _dayOfWeekParameter.SelectedValue;
    descriptorIsOrIsNot = _operator.SelectedValue;
}
/// <summary>
/// Validate the parameters
/// </summary>
/// <param name="errorInfo"></param>
/// <returns></returns>
public override bool Validate(out string errorInfo)
{
    errorInfo = string.Empty;
    if (_dayOfWeekParameter.IsSet && _operator.IsSet)
    {
        return true;
    }
    else
    {
        errorInfo = "Please select a day or an operator!";
        return false;
    }
}
#endregion
  }
}
```

FIG. 16 illustrates the resulting sentence-based verification 99.

It is important to note that while embodiments of the present invention have been described in the context of fully functional systems, program product, and methods/processes embodying the invention, those skilled in the art will appreciate that the mechanism of the present invention and/or aspects thereof are capable of being distributed in the form of a computer readable medium of instructions in a variety of forms for execution on a processor, processors, or the like, and that the present invention applies equally regardless of the particular type of signal bearing media used to actually carry out the distribution. Examples of computer readable media include, but are not limited to: nonvolatile, hard-coded type media such as read only memories (ROMs), CD-ROMs, and DVD-ROMs, or erasable, electrically programmable read only memories (EEPROMs), recordable type media such as floppy disks, hard disk drives, CD-R/RWs, DVD-RAMs, DVD-R/RWs, DVD+R/RWs, flash drives, and other newer types of memories, and transmission type media such as digital and analog communication links. For example, such media can include both operating instructions and/or instructions related to the systems 30, program product 47, described above, and the method steps described below.

Figure 17A:
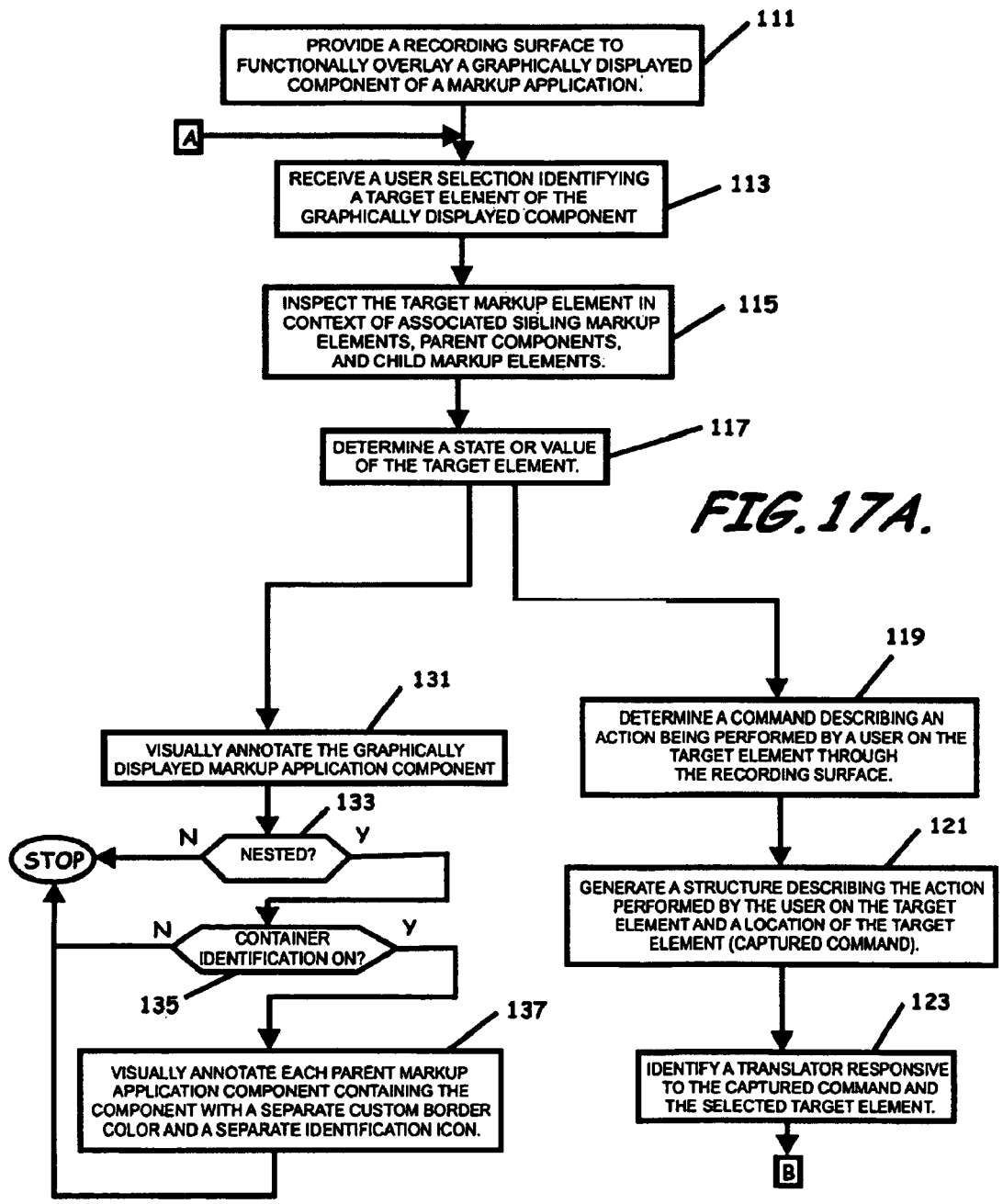
FIGS. 17A-B are a schematic flow diagram illustrating a method of providing automated application testing of a markup software application according to an embodiment of the present invention.
Figure 17B:
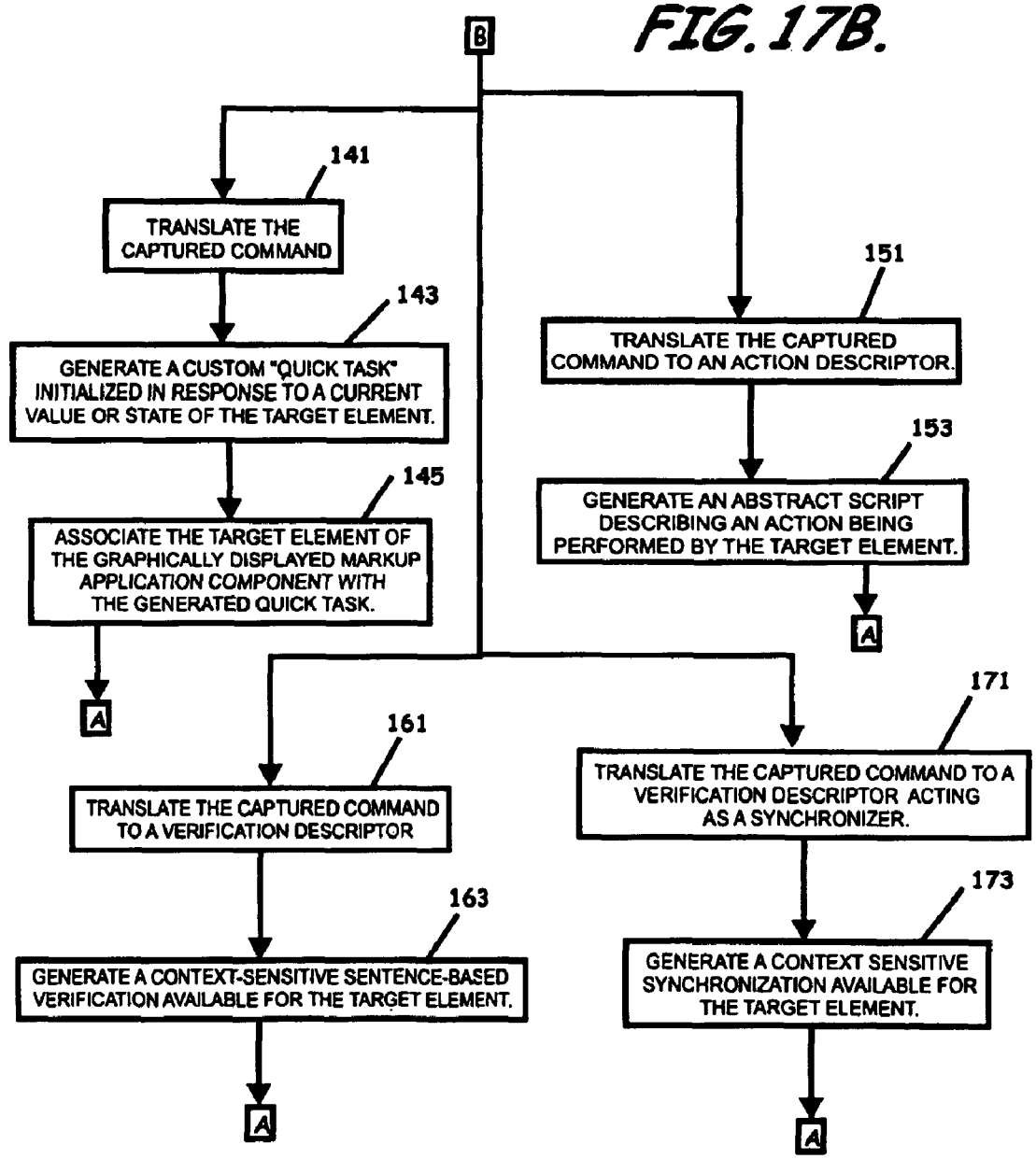
Figure 18:
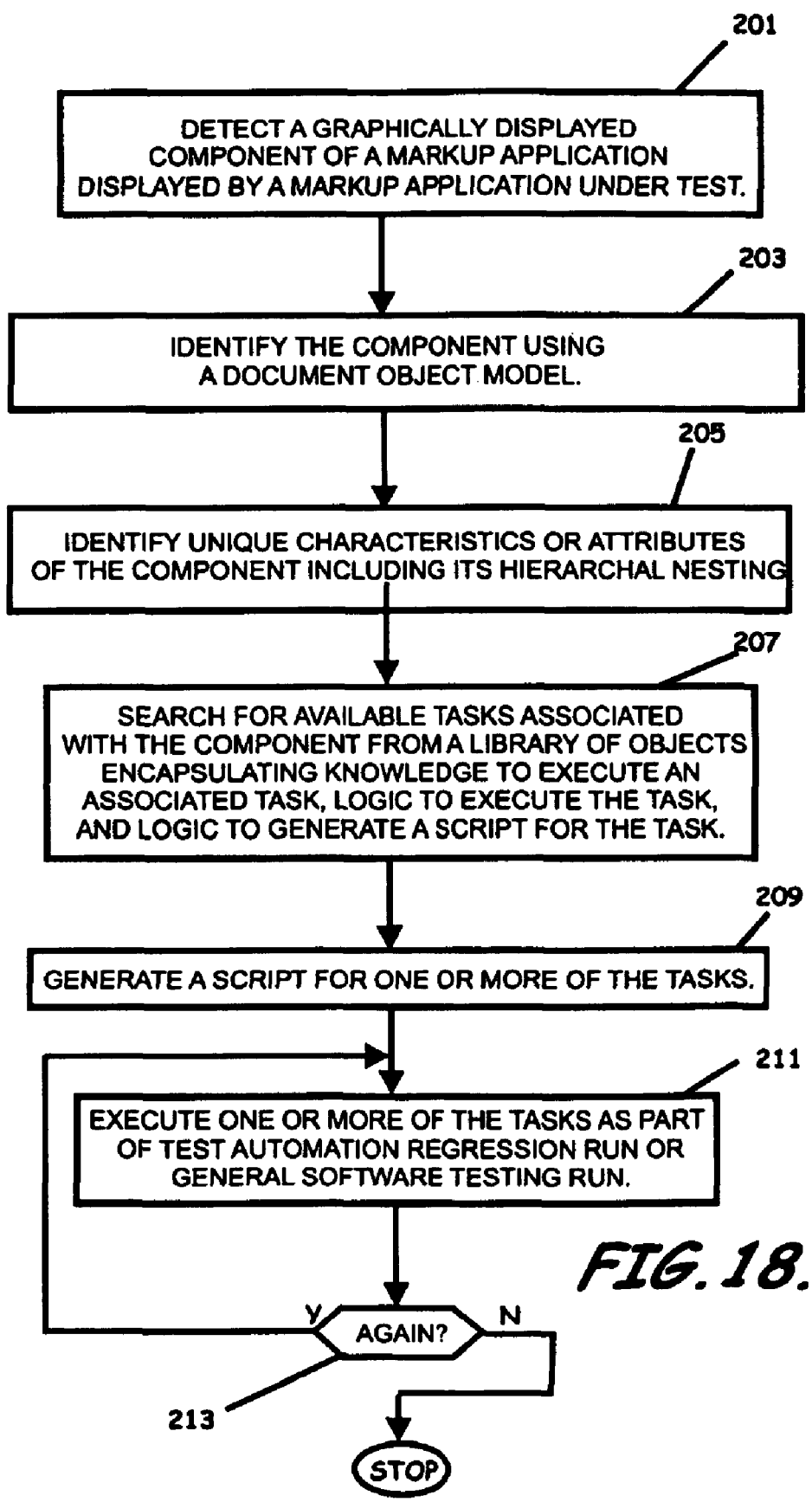
FIG. 18 is a schematic flow diagram illustrating a method of providing automated application testing of a markup software application according to an embodiment of the present invention.

Embodiments of the present invention also include computer implemented methods of providing automated application testing of a markup software application. As shown in FIGS. 17A-B, a method, according to an example of an embodiment of present invention, can include the steps of providing a recording surface 51 to functionally overlay a graphically displayed component 63 of a markup application being executed on and displayed by a computer 39, 43, to capture graphical user inputs to a target markup element 65 of the graphically displayed markup application component 63 (block 111), receiving a user selection identifying a target markup element 65 of the graphically displayed component 63 responsive to manipulation of a graphically displayed pointer 61 displayed by the computer 39, 43 (block 113), and inspecting the target markup element 65 in context of associated sibling markup elements, parent components 63', and child markup elements, when existing, responsive to the graphical user input, to thereby record the action performed by the target markup element 65 (block 115).

The method can also include determining a state or value of the target markup element 65 (block 117), determining a command describing an action being performed by the user on the target markup element 65 through the recording surface 51 (block 119), and generating a structure, e.g., captured command 52, describing the action performed by the user on the target markup element 65 and a location of the target markup element 65 (block 121), and identifying a translator 54 responsive to the captured command 52 and the selected target markup element 65 (block 123).

According to an embodiment of the method, the steps can also include visually annotating the graphically displayed markup application component with a custom border color 69 and identification icon 67 (block 131), and if nested (block 133) and if the user selects to highlight parent components/containers (block 135), the step of visually annotating at least one parent markup application component 63' containing the graphically displayed component 63 with a separate custom border color 69' and/or a separate identification icon 67'.

According to an embodiment of the method, the steps can also include translating the captured command 52 (block 141), generating a custom "quick task" initialized in response to a current value or state of the target markup element 65 (block 143), and associating the target markup element 65 with the generated quick task (block 145).

According to an embodiment of the method, the steps can also or alternatively include translating the captured command 52 to an automation descriptor 55, such as, for example, an ActionDescriptor (block151), and generating an abstract script describing an action being performed by the target markup element (block 153).

According to an embodiment of the method, the steps can also or alternatively include translating the captured command 52 to an automation descriptor 55 such as, for example, a VerificationDescriptor (block 161), and generating a context-sensitive sentence-based verification available for the target markup element (block 163).

According to an embodiment of the method, the steps can also or alternatively include translating the captured command 52 to an automation descriptor 55 such as, for example, a VerificationDescriptor acting as a synchronizer (block 171), generating a context sensitive synchronization available for the target markup element (block 173).

A method, according to an example of an embodiment of the present invention, can include the steps of detecting a graphically displayed component 63 of a markup application displayed by a markup application under test responsive to user graphical manipulation of a graphically displayed pointer 61 over the component (block 201), identifying the component 63 using a document object model, for example, an Internet Explorer object model, stored in a database 33 (block 203) and identifying the unique characteristics or attributes of the component 63 including its hierarchal nesting (block 205), responsive to the step of detecting and responsive to the unique characteristics or attributes of the component 63 including its hierarchal nesting. The method can also include searching for available tasks associated with the component 63 from a library of objects 37 responsive to the step of identification (block 207), generating a script for one or more of the tasks (block 209), and executing at least one available task multiple times as part of a testing runs (block 211), if selected to do so (block 213).

According to the preferred configuration, the task or tasks can include action, verification, and synchronization tasks. The action task or tasks include, for example, identification of the action performed by the target markup element within the graphically displayed component 63. The verification task or tasks can include, for example, verification that the action performed is the action to be performed, and/or verification that a value returned is the value expected to be returned. The synchronization task or tasks include, for example, identifying a temporal relationship to other tasks.

This application is related to U.S. Provisional Patent Application No. 61/012,049, filed Dec. 6, 2007, titled "System, Program Product, and Method to Enable Visual Recording and Editing of Test Automation Scenarios for Web Applications," U.S. patent application Ser. No. 11/598,519, filed Nov. 13, 2006, titled "System, Method, and Computer Readable Medium for Universal Software Testing," and U.S. Provisional Patent Application No. 60/852,314, filed Oct. 17, 2006, entitled "Software System And Method To Abstract Markup Applications For Expediting Test Script Authoring And Loosely Coupling Scripts From The Application Under Test," each incorporated herein by reference in its entirety.

In the drawings and specification, there have been disclosed a typical preferred embodiment of the invention, and although specific terms are employed, the terms are used in a descriptive sense only and not for purposes of limitation. The invention has been described in considerable detail with specific reference to these illustrated embodiments. It will be apparent, however, that various modifications and changes can be made within the spirit and scope of the invention as described in the foregoing specification. For example, the exemplary embodiments of the present invention were primarily directed to vessels. One skilled in the art would recognize the applicability to land and aerial vehicles.

APPENDIX 1

```
<!DOCTYPE html PUBLIC "-//W3C//DTD XHTML 1.0 Transitional//EN"
"http://www.w3.org/TR/xhtml1/DTD/xhtml1-transitional.dtd">
<html xmlns="http://www.w3.org/1999/xhtml">
<head>
    <title>Untitled Page </title>
</head>
<body>
```

APPENDIX 1-continued

```
<form name="form1" method="post" action="Default2.aspx" id="form1">
  <div>
    <input type="hidden" name="__EVENTTARGET" id="__EVENTTARGET" value="" />
    <input type="hidden" name="__EVENTARGUMENT" id="__EVENTARGUMENT" value="" />
    <input type="hidden" name="__VIEWSTATE" id="__VIEWSTATE"
value="/wEPDwULLTE4MTcwNTczOTkPZBYCAgMPZBYCAgUPPCsACgEADxYCHgJTRBYBBgAATOsxA
MoIZGRkjq60BtupcWpnLIKsd7bYF5R3Kok=" />
  </div>
  <script type="text/javascript">
//<![CDATA[
var theForm = document.forms['form1'];
if (!theForm) {
  theForm = document.form1;
}
function __doPostBack(eventTarget, eventArgument) {
  if (!theForm.onsubmit || (theForm.onsubmit( ) != false)) {
    theForm.__EVENTTARGET.value = eventTarget;
    theForm.__EVENTARGUMENT.value = eventArgument;
    theForm.submit( );
  }
}
//]]>
  </script>
  <div>
    <input type="submit" name="Btn1" value="Get Selected Date" id="Btn1" />
    <input name="Text1" type="text" value="11/29/2007 12:00:00 AM" id="Text1" />
    <table id="Calendar1" cellspacing="0" cellpadding="2" title="Calendar" border="0"
      style="border-width: 1px; border-style: solid; border-collapse: collapse;">
      <tr>
        <td colspan="7" style="background-color: Silver;">
          <table cellspacing="0" border="0" style="width: 100%; border-collapse: collapse;">
            <tr>
              <td style="width: 15%;">
                <a href="javascript:__doPostBack('Calendar1','V2861')" style="color: Black" title="Go to the
previous month">
                  <</a>
              </td>
              <td align="center" style="width: 70%;">
                December 2008
              </td>
              <td align="right" style="width: 15%;">
                <a href="javascript:__doPostBack('Calendar1','V2922')" style="color: Black" title="Go to the
next month">
                  ></a>
              </td>
            </tr>
          </table>
        </td>
      </tr>
      <tr>
        <th align="center" abbr="Sunday" scope="col">
          Sun
        </th>
        <th align="center" abbr="Monday" scope="col">
          Mon
        </th>
        <th align="center" abbr="Tuesday" scope="col">
          Tue
        </th>
        <th align="center" abbr="Wednesday" scope="col">
          Wed
        </th>
        <th align="center" abbr="Thursday" scope="col">
          Thu
        </th>
        <th align="center" abbr="Friday" scope="col">
          Fri
        </th>
        <th align="center" abbr="Saturday" scope="col">
          Sat
        </th>
      </tr>
      <tr>
        <td align="center" style="width: 14%;">
          <a href="javascript:__doPostBack('Calendar1','2885')" style="color: Black" title="November 25">
            25</a>
        </td>
        <td align="center" style="width: 14%;">
          <a href="javascript:__doPostBack('Calendar1','2886')" style="color: Black" title="November 26">
            26</a>
```

APPENDIX 1-continued

```
    </td>
    <td align="center" style="width: 14%;">
      <a href="javascript:__doPostBack('Calendar1','2887')" style="color: Black" title="November 27">
        27</a>
    </td>
    <td align="center" style="width: 14%;">
      <a href="javascript:__doPostBack('Calendar1','2888')" style="color: Black" title="November 28">
        28</a>
    </td>
    <td align="center" style="color: White; background-color: Silver, width: 14%;">
      <a href="javascript:__doPostBack('Calendar1','2889')" style="color: White" title="November 29">
        29</a>
    </td>
    <td align="center" style="width: 14%;">
      <a href="javascript:__doPostBack('Calendar1','2890')" style="color: Black" title="November 30">
        30</a>
    </td>
    <td align="center" style="width: 14%;">
      <a href="javascript:__doPostBack('Calendar1','2891')" style="color: Black" title="December 01">
        1</a>
    </td>
  </tr>
  <tr>
    <td align="center" style="width: 14%;">
      <a href="javascript:__doPostBack('Calendar1','2892')" style="color: Black" title="December 02">
        2</a>
    </td>
    <td align="center" style="width: 14%;">
      <a href="javascript:__doPostBack('Calendar1','2893')" style="color: Black" title="December 03">
        3</a>
    </td>
    <td align="center" style="width: 14%;">
      <a href="javascript:__doPostBack('Calendar1','2894')" style="color: Black" title="December 04">
        4</a>
    </td>
    <td align="center" style="width: 14%;">
      <a href="javascript:__doPostBack('Calendar1','2895')" style="color: Black" title="December 05">
        5</a>
    </td>
    <td align="center" style="width: 14%;">
      <a href="javascript:__doPostBack('Calendar1','2896')" style="color: Black" title="December 06">
        6</a>
    </td>
    <td align="center" style="width: 14%;">
      <a href="javascript:__doPostBack('Calendar1','2897')" style="color: Black" title="December 07">
        7</a>
    </td>
    <td align="center" style="width: 14%;">
      <a href="javascript:__doPostBack('Calendar1','2898')" style="color: Black" title="December 08">
        8</a>
    </td>
  </tr>
  <tr>
    <td align="center" style="width: 14%;">
      <a href="javascript:__doPostBack('Calendar1','2899')" style="color: Black" title="December 09">
        9</a>
    </td>
    <td align="center" style="width: 14%;">
      <a href="javascript:__doPostBack('Calendar1','2900')" style="color: Black" title="December 10">
        10</a>
    </td>
    <td align="center" style="width: 14%;">
      <a href="javascript:__doPostBack('Calendar1','2901')" style="color: Black" title="December 11">
        11</a>
    </td>
    <td align="center" style="width: 14%;">
      <a href="javascript:__doPostBack('Calendar1','2902')" style="color: Black" title="December 12">
        12</a>
    </td>
    <td align="center" style="width: 14%;">
      <a href="javascript:__doPostBack('Calendar1','2903')" style="color: Black" title="December 13">
        13</a>
    </td>
    <td align="center" style="width: 14%;">
      <a href="javascript:__doPostBack('Calendar1','2904')" style="color: Black" title="December 14">
        14</a>
    </td>
    <td align="center" style="width: 14%;">
      <a href="javascript:__doPostBack('Calendar1','2905')" style="color: Black" title="December 15">
        15</a>
```

APPENDIX 1-continued

```
      </td>
   </tr>
   <tr>
      <td align="center" style="width: 14%;">
         <a href="javascript:__doPostBack('Calendar1','2906')" style="color: Black" title="December 16">
            16</a>
      </td>
      <td align="center" style="width: 14%;">
         <a href="javascript:__doPostBack('Calendar1','2907')" style="color: Black" title="December 17">
            17</a>
      </td>
      <td align="center" style="width: 14%;">
         <a href="javascript:__doPostBack('Calendar1','2908')" style="color: Black" title="December 18">
            18</a>
      </td>
      <td align="center" style="width: 14%;">
         <a href="javascript:__doPostBack('Calendar1','2909')" style="color: Black" title="December 19">
            19</a>
      </td>
      <td align="center" style="width: 14%;">
         <a href="javascript:__doPostBack('Calendar1','2910')" style="color: Black" title="December 20">
            20</a>
      </td>
      <td align="center" style="width: 14%;">
         <a href="javascript:__doPostBack('Calendar1','2911')" style="color: Black" title="December 21">
            21</a>
      </td>
      <td align="center" style="width: 14%;">
         <a href="javascript:__doPostBack('Calendar1','2912')" style="color: Black" title="December 22">
            22</a>
      </td>
   </tr>
   <tr>
      <td align="center" style="width: 14%;">
         <a href="javascript:__doPostBack('Calendar1','2913')" style="color: Black" title="December 23">
            23</a>
      </td>
      <td align="center" style="width: 14%;">
         <a href="javascript:__doPostBack('Calendar1','2914')" style="color: Black" title="December 24">
            24</a>
      </td>
      <td align="center" style="width: 14%;">
         <a href="javascript:__doPostBack('Calendar1','2915')" style="color: Black" title="December 25">
            25</a>
      </td>
      <td align="center" style="width: 14%;">
         <a href="javascript:__doPostBack('Calendar1','2916')" style="color: Black" title="December 26">
            26</a>
      </td>
      <td align="center" style="width: 14%;">
         <a href="javascript:__doPostBack('Calendar1','2917')" style="color: Black" title="December 27">
            27</a>
      </td>
      <td align="center" style="width: 14%;">
         <a href="javascript:__doPostBack('Calendar1','2918')" style="color: Black" title="December 28">
            28</a>
      </td>
      <td align="center" style="width: 14%;">
         <a href="javascript:__doPostBack('Calendar1','2919')" style="color: Black" title="December 29">
            29</a>
      </td>
   </tr>
   <tr>
      <td align="center" style="width: 14%;">
         <a href="javascript:__doPostBack('Calendar1','2920')" style="color: Black" title="December 30">
            30</a>
      </td>
      <td align="center" style="width: 14%;">
         <a href="javascript:__doPostBack('Calendar1','2921')" style="color: Black" title="December 31">
            31</a>
      </td>
      <td align="center" style="width: 14%;">
         <a href="javascript:__doPostBack('Calendar1','2922')" style="color: Black" title="January 01">
            1</a>
      </td>
      <td align="center" style="width: 14%;">
         <a href="javascript:__doPostBack('Calendar1','2923')" style="color: Black" title="January 02">
            2</a>
      </td>
      <td align="center" style="width: 14%;">
```

APPENDIX 1-continued

```
            <a href="javascript:__doPostBack('Calendar1','2924')" style="color: Black" title="January 03">
                3</a>
        </td>
        <td align="center" style="width: 14%;">
            <a href="javascript:__doPostBack('Calendar1','2925')" style="color: Black" title="January 04">
                4</a>
        </td>
        <td align="center" style="width: 14%;">
            <a href="javascript:__doPostBack('Calendar1','2926')" style="color: Black" title="January 05">
                5</a>
        </td>
    </tr>
</table>
</div>
<div>
    <input type="hidden" name="__EVENTVALIDATION" id="__EVENTVALIDATION"
value="/wEWLwLyntbzCwKyotaICwLzlKGwCgLB2/DfDgK78e7dCQLg3tOZCALg3s+0AQLg3rvQCgLg3te4Dw
Lg3sNTAtv31fwDAtv3wZcLAtv3vbMMAtv3qe4FAtv3hYkNAtv38
QGAtv37d8PAtv32XoC2/f1wwUC2/fh/g4CmJSgiAsCmJScowwCmJSI3gUCmJTk+Q4CmJTQlAYCmJTMzw8Cm
JS4awKYlJSGCAKYlMDuDgKYILyKBgLzrc6SAQLzrbrOCgLzrZbpAw
LzrYKECwLzrf6/DALzreraBQLzrcb1DgLzrbKRBgLzre75BALzrdqUDALuuuy9DwLuuthYAu66tPQJAu66oK8B
Au66nMoKAu66iOUDAu665IALZQGOGob/7tqvVJQTZQ6sD3VHlkA=" />
</div>
</form>
</body>
</html>
```

That claimed is:

1. A system to provide automated application testing of a markup software application, the system comprising:

a computer network;

a first database including a plurality of document object models having object characteristics and attributes;

a second database including a plurality of predefined translators, each translator translating between an element in at least one of the plurality of document object models and an abstract definition of an action, verification, and synchronization available to any element of any one of the plurality of document object models matching the element associated with the respective translator, at least portions of the plurality of translators interconnected to form a nested tree of translators;

a third database including a plurality of predefined descriptors objects each encapsulating operations to execute an associated task, logic to execute the task, and logic to generate a script for the task;

a first computer in communication with the computer network to execute server functions of software applications under test, the first computer including a processor and memory in communication with the processor;

a second computer in communication with the first computer through the computer network and each of the first, second, and third databases to execute client functions of software applications under test, the second computer including a processor and memory in communication with the processor; and application testing program stored in the memory of at least one of the first or the second computers and including instructions that when executed by the processor of the respective computer causes the respective computer to perform the operations of:

providing a recording surface to functionally overlay a graphically displayed component of a markup application to capture graphical user inputs to a target element of the graphically displayed markup application component, receiving a user selection identifying the target element of the graphically displayed component of the markup application responsive to the graphical user inputs, determining a command describing an action being performed by the user on the target element through the recording surface, generating a structure describing the action performed by the user on the target element and a location of the target element to define a captured command, identifying a translator responsive to the captured command and the selected target element, and generating an abstract script describing an action being performed by the target element responsive to the identified translator;

wherein the application testing program further comprises:

a translation manager configured to manage locating the translator associated with the captured command, when existing, the translation manager including a control locator interface configured to provide data to match the target element with the translator; and a find parameter locator configured to match a translator locator element with the translator, the matched translator locator element containing the entire hierarchy of the graphically displayed component;

wherein the translation manager is further configured to pass the matched translator locator element to the translator to thereby allow the user to inspect and abstract actions into higher-level actions intrinsic to the graphically displayed component under the action.

2. A system as defined in claim 1, wherein the application testing program further includes instructions that when executed by the processor of the respective computer, causes the computer to perform one or both of the following operations:

generating a context-sensitive sentence-based verification available for the target element responsive to the identified translator; and generating a context sensitive synchronization available for the target element responsive to the identified translator.

3. A system as defined in claim 1, wherein the application testing program further includes instructions that when executed by the processor of the respective computer, causes the computer to perform the operation of:

visually annotating the graphically displayed markup application component positioned under a user-controlled graphically displayed pointer and each parent markup application component containing the graphically displayed markup application component with a separate custom border color and a separate identification icon responsive to user movement of the graphically displayed pointer.

4. A system as defined in claim 1, wherein the application testing program further includes instructions that when executed by the processor of the respective computer, causes the computer to perform the operation of:

performing a continuous visual annotation of target elements positioned under a user-controlled graphically displayed pointer responsive to user movement of the graphically displayed pointer, to include the operations of:

continuously inspecting attributes and nesting hierarchy of each element under the graphically displayed pointer, and searching a plurality of custom markup application components and custom visual annotations associated therewith.

5. A system as defined in claim 1,
wherein the recording surface generates at least one custom task initialized responsive to at least one current value or state of the target element under a graphically displayed pointer to define a quick task; and
wherein the application testing program further includes instructions that when executed by the processor of the respective computer, causes the computer to perform the operation of associating the target element of the graphically displayed markup application component with the generated quick task.

6. A system as defined in claim 1, wherein the application testing program further includes instructions that when executed by the processor of the respective computer, causes the computer to perform the operation of:

generating a context-sensitive sentence-based verification available for the target element, the verification including a plurality of customizable word pieces initialized with context-sensitive default values.

7. A system as defined in claim 1, wherein the application testing program includes:

a recorder configured to provide the recording surface for a graphically displayed pointer to overlay the graphically displayed component of the markup application to capture the graphical user inputs to the target element and to generate the structure describing an action performed by the user on the target element and a location of the target element.

8. A system as defined in claim 7
wherein the find parameter locator is further configured to describe the location of the target element to thereby describe document object model elements of each of a plurality of document object models of interest to the translator associated with the target element to provide the translation manager data to select the translator associated with the target element from a plurality of translators; and
wherein the application testing program further includes a container identifier configured to identify each document object model element found by the find parameter locator.

9. A system as defined in claim 8, wherein the application testing program includes:

an automation descriptor configured to provide data to execute a task, logic to execute the task, and logic to generate script for the task; and
a quick task interface configured to display natural language action, verification, and synchronization descriptors associated with the translator.

10. A system to provide automated application testing of a markup software application, the system comprising:

a first computer in communication with a computer network to execute server functions of software applications under test, the first computer including a processor and memory in communication with the processor;

a second computer in communication with the first computer through the computer network to execute client functions of software applications under test, the second computer including a processor and memory in communication with the processor; and application testing program stored in the memory of at least one of the first or the second computers and including instructions that when executed by the processor of the respective computer causes the respective computer to perform the operations comprising:

providing a recording surface to functionally overlay a graphically displayed component of a markup application to capture graphical user inputs to a target markup element of the graphically displayed markup application component to thereby generate a structure describing an action performed by a user on the target markup element, and identifying a translator responsive to the action performed by the user on the target markup element, the translator translating between the target markup element in at least one document object model and an abstract definition of an action, verification, and synchronization available to any element within the at least one document object model matching the target markup element associated with the respective translator, wherein the application testing program includes:

a translation manager configured to manage locating the translator associated with the action, when existing, the translation manager including a control locator interface configured to provide data to match the target element with the translator, and a find parameter locator configured to match a translator locator element with the translator, the matched translator locator element containing the entire hierarchy of the graphically displayed component, wherein the translation manager is further configured to pass the matched translator locator element to the translator to thereby allow the user to inspect and abstract actions into higher-level actions intrinsic to the graphically displayed component under the action, and wherein the operations further comprise generating one or more of the following: a customized abstract script describing an action being performed by the target markup element; a context-sensitive sentence-based verification available for the target markup element, and a context sensitive synchronization available for the target markup element, responsive to a graphical user input.

11. A system as defined in claim 10, wherein the application testing program further includes instructions that when executed by the processor of the respective computer, causes the computer to perform the operation of:

inspecting the target markup element in context of associated sibling markup elements, parent markup components, and child markup elements, when existing, responsive to the graphical user input, to thereby record the action performed by the target markup element.

12. A system as defined in claim 11, wherein the application testing program further includes instructions that when executed by the processor of the respective computer, causes the computer to perform the operations of:
receiving a user selection identifying the target markup element of the graphically displayed component of the markup application responsive to the graphical user input;
determining a command describing an action being performed by the user on the target markup element through the recording surface;
generating the structure describing the action performed by the user on the target markup element and a location of the target markup element to define a captured command; and
identifying the translator responsive to the captured command and the selected target markup element.

13. A system as defined in claim 10, wherein the application testing program further includes instructions that when executed by the processor of the respective computer, causes the computer to perform the operation of:
visually annotating the graphically displayed markup application component positioned under a user-controlled graphically displayed pointer and each parent markup application component containing the graphically displayed markup application component with at least one of a separate custom border color or a separate identification icon responsive to user movement of the graphically displayed pointer.

14. A system as defined in claim 10, wherein the application testing program further includes instructions that when executed by the processor of the respective computer, causes the computer to perform the operation of:
performing a continuous visual annotation of target markup elements positioned under a user-controlled graphically displayed pointer responsive to user movement of the graphically displayed pointer, to include the operations of:
continuously inspecting attributes and nesting hierarchy of each element under the graphically displayed pointer, and
searching a plurality of custom markup application components and custom visual annotations associated therewith to thereby perform the continuous visual annotation of target markup elements.

15. A system as defined in claim 10,
wherein the recording surface generates at least one custom task initialized responsive to at least one current value or state of the target markup element under the graphically displayed pointer to define a quick task; and
wherein the application testing program further includes instructions that when executed by the processor of the respective computer, causes the computer to perform the operation of associating the target markup element of the graphically displayed markup application component with the generated quick task.

16. A system as defined in claim 10, wherein the application testing program further includes instructions that when executed by the processor of the respective computer, causes the computer to perform the operation of:
generating a context-sensitive sentence-based verification available for the target markup element, the verification including a plurality of customizable word pieces initialized with context-sensitive default values.

17. A system as defined in claim 13, wherein the application testing program includes:
a recorder configured to provide the recording surface for a graphically displayed pointer to overlay the graphically displayed component of the markup application; and
a container identifier configured to identify each document object model element found by the find parameter locator.

18. A system as defined in claim 17, wherein the application testing program includes:
an automation descriptor configured to provide data to execute a task, logic to execute the task, and logic to generate script for the task; and
a quick task interface configured to display natural language action, verification, and synchronization descriptors associated with the translator.

19. Application testing program to provide automated application testing of a markup software application, stored in a non-transitory computer readable medium, and comprising a set of instructions that, when executed by a computer, cause the computer to perform the operations comprising:
providing a recording surface to functionally overlay a graphically displayed component of a markup application to capture graphical user inputs to a target markup element of the graphically displayed markup application component to thereby generate a structure describing an action performed by the user on the target markup element; and
identifying a translator responsive to the action performed by the user on the target markup element, the translator translating between the target markup element in at least one document object model and an abstract definition of an action, verification, and synchronization available to any element within the at least one document object model matching the target markup element associated with the respective translator,
wherein the application testing program includes:
a translation manager configured to manage locating the translator associated with the action, when existing, the translation manager including a control locator interface configured to provide data to match the target element with the translator, and
a find parameter locator configured to match a translator locator element with the translator, the matched translator locator element containing the entire hierarchy of the graphically displayed component,
wherein the translation manager is further configured to pass the matched translator locator element to the translator to thereby allow the user to inspect and abstract actions into higher-level actions intrinsic to the graphically displayed component under the action, and
wherein the operations further comprise generating one or more of the following: a customized abstract script describing the action being performed by the target markup element; a context-sensitive sentence-based verification available for the target markup element, and a context sensitive synchronization available for the target markup element, responsive to a graphical user input.

20. The application testing program as defined in claim 19, wherein the operations further comprise:
inspecting the target markup element in context of associated sibling markup elements, parent components, and child markup elements, when existing, responsive to the graphical user input, to thereby record the action performed by the target markup element.

21. The application testing program as defined in claim 20, wherein the operations further comprise:
receiving a user selection identifying the target markup element of the graphically displayed component of the markup application responsive to the graphical user input;
determining a command describing an action being performed by the user on the target markup element through the recording surface;
generating the structure describing the action performed by the user on the target markup element and a location of the target markup element to define a captured command; and
identifying the translator responsive to the captured command and the selected target markup element.

22. The application testing program as defined in claim 19, wherein the operations further comprise:
visually annotating the graphically displayed markup application component positioned under a user-controlled graphically displayed pointer and each parent markup application component containing the graphically displayed markup application component with at least one of a separate custom border color or a separate identification icon responsive to user movement of the graphically displayed pointer.

23. The application testing program as defined in claim 19, wherein the operations further comprise:
performing a continuous visual annotation of target markup elements positioned under a user-controlled graphically displayed pointer responsive to user movement of the graphically displayed pointer, to include the operations of:
continuously inspecting attributes and nesting hierarchy of each element under the graphically displayed pointer, and
searching a plurality of custom markup application components and custom visual annotations associated therewith to thereby perform the continuous visual annotation of target markup elements.

24. The application testing program as defined in claim 19, wherein the recording surface generates at least one custom task initialized responsive to at least one current value or state of the target markup element under the graphically displayed pointer to define a quick task; and
wherein the operations further comprise associating the target markup element of the graphically displayed markup application component with the generated quick task.

25. The application testing program as defined in claim 19, wherein the operations further comprise:
generating a context-sensitive sentence-based verification available for the target markup element, the verification including a plurality of customizable word pieces initialized with context-sensitive default values.

26. The application testing program as defined in claim 21, including:
a recorder configured to provide the recording surface for a graphically displayed pointer to overlay the graphically displayed component of the markup application; and
a container identifier configured to identify each document object model element found by the find parameter locator.

27. The application testing program as defined in claim 21, including:
an automation descriptor configured to provide data to execute a task, logic to execute the task, and logic to generate script for the task; and
a quick task interface configured to display natural language action, verification, and synchronization descriptors associated with the translator.

28. Application testing program to provide automated application testing of a markup software application, stored in a non-transitory computer readable medium, and comprising:
a recording surface for a graphically displayed pointer to overlay a graphically displayed component of a markup application to capture graphical user inputs to a target markup element and to generate a structure describing an action performed by the user on the target markup element and a location of the target markup element defining a captured command;
logic for identifying a translator responsive to the action performed by the user on the target markup element, the translator translating between the target markup element in at least one document object model and an abstract definition of an action, verification, and synchronization available to any element within the at least one document object model matching the target markup element associated with the respective translator;
a translation manager configured to manage locating the translator associated with the captured command, when existing, the translation manager including a control locator interface configured to provide data to match the target element with the translator;
a find parameter locator configured to match a translator locator element with the translator, the matched translator locator element containing the entire hierarchy of the graphically displayed component;
wherein the translation manager is further configured to pass the matched translator locator element to the translator to thereby allow the user to inspect and abstract actions into higher-level actions intrinsic to the graphically displayed component under the action; and
an automation descriptor configured to provide data to execute a task, logic to execute the task, and logic to generate script for the task responsive to the translator.

29. Program as defined in claim 28, further comprising:
a container identifier configured to identify each document object model element found by the find parameter locator.

30. The application testing program as defined in claim 28, further comprising:
a quick task interface configured to display natural language action, verification, and synchronization descriptors associated with the translator.

31. The application testing program as defined in claim 28, further comprising:
a visual annotator configured to provide a visual annotation associated with the translator including its associated custom identification icon and border color, and a custom visual annotation associated with any related parent translators.

32. A computer implemented method of providing automated application testing of a markup software application, the method comprising the steps of:
providing a recording surface to functionally overlay a graphically displayed component of a markup application being executed on and displayed by a computer to capture graphical user inputs to a target markup element of the graphically displayed markup application component;

receiving a user selection by a user identifying the target markup element of the graphically displayed component responsive to manipulation of a graphically displayed pointer displayed by the computer defining a graphical user input;

determining a command describing an action being performed by the user on the target markup element through the recording surface;

generating a structure describing the action performed by the user on the target markup element and a location of the target markup element to define a captured command;

identifying a translator responsive to the captured command and the selected target markup element, the translator between the target markup element in at least one document object model and an abstract definition of an action, verification, and synchronization available to an element within the at least one document object model matching the target markup element associated with the respective translator, and the translator being associated with the captured command, located when existing, to thereby translate the captured command to an automated descriptor;

providing, via a control locator interface, data to match the target markup element with the translator;

matching a translator locator element with the translator, the matched translator locator element containing the entire hierarchy of the graphically displayed component;

passing the matched translator locator element to the translator to thereby allow the user to inspect and abstract actions into higher-level actions intrinsic to the graphically displayed component under the action; and generating script comprising one or more of the following: a customized abstract script describing an action being performed by the target markup element, a context-sensitive sentence-based verification available for the target markup element, and a context sensitive synchronization available for the target markup element, responsive to the graphical user input and the automation descriptor.

33. A method as defined in claim 32, further comprising the step of:
inspecting the target markup element in context of associated sibling markup elements, child markup elements, or parent components, when existing, responsive to the graphical user input, to thereby record the action performed by the target markup element.

34. A method as defined in claim 32, further comprising the step of:
visually annotating the graphically displayed component with one or more of the following: a custom border color and identification icon.

35. A method as defined in claim 34, wherein the target markup element is nested, the method further comprising the step of:
visually annotating at least one parent markup application component containing the graphically displayed component with a separate custom border color and a separate identification icon.

36. A method as defined in claim 32, further comprising the steps of:
determining a state or value of the target markup element;
generating a custom quick task initialized in response to a current value or state of the target markup element; and
associating the target markup element of the graphically displayed markup application component with the generated quick task.

37. A method as defined in claim 32, further comprising the steps of:
translating the captured command to an action descriptor; and
generating an abstract script describing an action being performed by the target markup element.

38. A method as defined in claim 32, further comprising the steps of:
translating the captured command to a verification descriptor; and
generating a context-sensitive sentence-based verification available for the target markup element.

39. A method as defined in claim 32, further comprising the steps of:
translating the captured command to a verification descriptor acting as a synchronizer; and
generating a context sensitive synchronization available for the target markup element.

40. A computer implemented method of providing automated application testing of a markup software application, the method comprising the steps of:
detecting a graphically displayed component of a markup application displayed by a markup application under test on a computer responsive to user graphical manipulation of a graphically displayed pointer over the component, the graphical manipulation comprising a command;

identifying the graphically displayed component using a document object model stored in a database and unique characteristics or attributes of the graphically displayed component including its hierarchal nesting responsive to the step of detecting;

searching for available tasks associated with the component from a library of objects responsive to the step of identifying the component;

identifying a translator responsive to the identified component and the command, the translator configured to translate between the identified component in the document object model and an abstract definition of an action, verification, and synchronization available to an element within the document object model matching the identified component associated with the respective translator, the translator being associated with the captured command, located when existing;

providing, via a control locator interface, data to match a target markup element with the translator;

matching a translator locator element with the translator, the matched translator locator element containing the entire hierarchy of the graphically displayed component;

passing the matched translator locator element to the translator to thereby allow the user to inspect and abstract actions into higher-level actions intrinsic to the graphically displayed component under the action;

generating, responsive to the identified translator, a script for one or more of the tasks; and executing at least one available task multiple times as part of one or more of the following: a test automation regression run and a software testing run.

41. A method as defined in claim 40, wherein the tasks include action, verification, and synchronization tasks.

42. A method as defined in claim 41,
wherein the action tasks include identification of the action performed by a selected element within the graphically displayed component;
wherein the verification tasks include one or more of the following: verification that the action performed is the action to be performed, and verification that a value returned is the value expected to be returned; and
wherein the synchronization tasks include identifying a temporal relationship to other tasks.

* * * * *